US011328444B2

(12) United States Patent
Yamazaki et al.

(10) Patent No.: US 11,328,444 B2
(45) Date of Patent: May 10, 2022

(54) SIGNAL PROCESSING APPARATUS, SIGNAL PROCESSING METHOD, PROGRAM, MOBILE OBJECT, AND SIGNAL PROCESSING SYSTEM

(71) Applicant: Sony Corporation, Tokyo (JP)

(72) Inventors: Toshio Yamazaki, Tokyo (JP); Takuto Motoyama, Tokyo (JP); Kentaro Doba, Tokyo (JP); Yasuhiro Sutou, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 145 days.

(21) Appl. No.: 16/639,127

(22) PCT Filed: Aug. 8, 2018

(86) PCT No.: PCT/JP2018/029731
§ 371 (c)(1),
(2) Date: Feb. 14, 2020

(87) PCT Pub. No.: WO2019/039279
PCT Pub. Date: Feb. 28, 2019

(65) Prior Publication Data
US 2020/0211219 A1    Jul. 2, 2020

(30) Foreign Application Priority Data

Aug. 22, 2017  (JP) .............................. JP2017-159406

(51) Int. Cl.
G06T 7/73     (2017.01)
H04N 13/239   (2018.01)
(Continued)

(52) U.S. Cl.
CPC ................ G06T 7/74 (2017.01); G01S 13/08 (2013.01); G01S 13/89 (2013.01); G06T 7/0002 (2013.01);
(Continued)

(58) Field of Classification Search
CPC ....... H04N 13/239; G06T 7/0002; G06T 7/74; G06T 2207/20224; G06T 2207/10012;
(Continued)

(56) References Cited

U.S. PATENT DOCUMENTS

2004/0098224 A1* 5/2004 Takahashi ............. G01S 13/865
                                                    702/181
2014/0218226 A1   8/2014 Raz et al.
(Continued)

FOREIGN PATENT DOCUMENTS

JP    2001-091654 A    4/2001
JP    2003-315442 A    11/2003
(Continued)

OTHER PUBLICATIONS

Extended European search report dated Jul. 31, 2020, in corresponding European patent Application No. 18848893.6, 12 pages.
(Continued)

Primary Examiner — Brenda C Bernardi
(74) Attorney, Agent, or Firm — Xsensus, LLP

(57) ABSTRACT

The present disclosure relates to a signal processing apparatus and system. In calibration, a sensor section is used to acquire a time of day when a stereo camera image capturing a target is acquired and a time of day when a radar image capturing the target is acquired. The target has a radar reflector and a marker. The image acquisition times of day are acquired while at the same time changing a distance between the sensor section and the target so as to find an amount of time-of-day discrepancy, a difference in time of day between the stereo camera image and the radar image at the same distance. At the time of object detection, the radar image acquired first is buffered and then output together with
(Continued)

the stereo camera image acquired by the time-of-day discrepancy later, thus combining the stereo camera image and the radar image.

17 Claims, 22 Drawing Sheets

(51) Int. Cl.
*G01S 13/08* (2006.01)
*G01S 13/89* (2006.01)
*G06T 7/00* (2017.01)
*G06V 10/25* (2022.01)

(52) U.S. Cl.
CPC ........... *G06V 10/25* (2022.01); *H04N 13/239* (2018.05); *G06T 2207/10012* (2013.01); *G06T 2207/10044* (2013.01); *G06T 2207/20224* (2013.01)

(58) Field of Classification Search
CPC ........... G06T 2207/10044; G01S 13/86; G01S 13/08; G01S 13/867; G01S 13/89; G01S 13/93; G01S 17/86; G01S 17/87; G01S 13/865; G01C 3/14; G06K 9/3233; G08G 1/16; G08G 1/00
See application file for complete search history.

(56) References Cited

U.S. PATENT DOCUMENTS

2017/0199271 A1* 7/2017 Nihei .................. G01S 7/484
2018/0284256 A1* 10/2018 Sutou .................. G01S 13/931
2020/0086871 A1* 3/2020 Gotoda ................ B60W 30/18

FOREIGN PATENT DOCUMENTS

| JP | 2004-037239 A | 2/2004 |
| JP | 2004-347471 A | 12/2004 |
| JP | 2011-220732 A | 11/2011 |
| JP | 2017-125829 A | 7/2017 |
| WO | 2017/057056 A1 | 4/2017 |

OTHER PUBLICATIONS

International Search Report and Written Opinion dated Oct. 30, 2018 for PCT/JP2018/029731 filed on Aug. 8, 2018, 12 pages including English Translation of the International Search Report.
Huck, T., et al., "Precise Timestamping and Temporal Synchronization in Multi-Sensor Fusion," 2011 IEEE Intelligent Vehicles Symposium (IV), Baden-Baden, Germany, Jun. 5-6, 2011, pp. 242-247.

* cited by examiner

SIGNAL PROCESSING APPARATUS, SIGNAL PROCESSING METHOD, PROGRAM, MOBILE OBJECT, AND SIGNAL PROCESSING SYSTEM

CROSS-REFERENCE TO RELATED APPLICATIONS

The present application is based on PCT filing PCT/JP2018/029731, filed Aug. 8, 2018, which claims priority to JP 2017-159406, filed Aug. 22, 2017, the entire contents of each are incorporated herein by reference.

TECHNICAL FIELD

The present disclosure relates to a signal processing apparatus, a signal processing method, a program, a mobile object, and a signal processing system and, particularly, to a signal processing apparatus, a signal processing method, a program, a mobile object, and a signal processing system that make it possible to properly combine and use detection results of a plurality of sensors.

BACKGROUND ART

A technology has been proposed that ensures improved detection accuracy by combining and using detection results of a plurality of sensors.

This technology finds, through calibration and in advance, an amount of time-of-day discrepancy between time-of-day information when a predetermined object is detected by a first object detection sensor, a reference, at a predetermined position and time-of-day information when the same predetermined object is detected by a second object detection sensor, a target subject to calibration, at the same predetermined position as an amount of time-of-day discrepancy.

At this time, hardware time stamps using accurate UTC (Coordinated Universal Time) are used for time-of-day information when the same object is detected in the same state by the first object detection sensor and the second object detection sensor.

Then, at the time of actual detection of an object, the discrepancy between the detection time of day with the second object detection sensor and the detection time of day with the first detection sensor is predicted and compensated for with a Kalman filter based on an amount of time-of-day discrepancy found in advance, and the detection result of the first object detection sensor and the detection result of the second object detection sensor are synchronized and combined (refer to NPL 1).

As described above, the detection result accuracy is improved as a result of combining of the detection results of the first object detection sensor and the second object detection sensor with their object detection time-of-day information matched.

It should be noted that, in this case, it is necessary to assign accurate UTC-based time stamps to the first object detection sensor and the second object detection sensor, respectively, as detection times of day.

CITATION LIST

Non-Patent Literature

NPL 1

2011 IEEE Intelligent Vehicles Symposium (IV) Baden-Baden, Germany, Jun. 5-9, 2011 Precise Timestamping and Temporal Synchronization in Multi-Sensor Fusion

SUMMARY

Technical Problems

Incidentally, in the case where more accurate and more robust detected object distance information is found by using a millimeter wave radar and a stereo camera as a plurality of different object detection sensors and combine detection results of the two, a possible solution would be to find an amount of time-of-day discrepancy, a discrepancy in time-of-day information detected in advance and find, by a prediction process, a time-of-day discrepancy by using a Kalman filter and correct the time-of-day discrepancy as in NPL 1.

However, the prediction process using a Kalman filter involves a significant load. Moreover, the prediction process merely predicts a time-of-day discrepancy and cannot necessarily correct the time-of-day discrepancy properly.

Also, a discrepancy time in detection time of day between object detection sensors for detecting different targets cannot be detected with high accuracy. As a result, there has been a limitation on the accuracy for predicting a time-of-day discrepancy with a Kalman filter on the basis of time-of-day discrepancy information of low accuracy.

The present disclosure has been devised in light of the foregoing, and it is particularly an object of the present disclosure to ensure improved accuracy in detection results by properly synchronizing and combining detection results of a plurality of object detection sensors.

Solution to Problems

A signal processing apparatus of an aspect of the present disclosure includes a first object detection section adapted to detect an object, a second object detection section adapted to detect an object and different from the first object detection section, and a time-of-day discrepancy detection section adapted to detect, as an amount of time-of-day discrepancy, a time-of-day discrepancy between a first time of day when a predetermined target is detected by the first object detection section and a second time of day when the predetermined target is detected by the second object detection section.

The signal processing apparatus further includes a buffering section adapted to buffer detection results of the object of at least any one of the first object detection section or the second object detection section and a time-of-day discrepancy correction section adapted to set an amount of delay caused by the buffering section according to the amount of time-of-day discrepancy and correct the time-of-day discrepancy.

The predetermined target is an object used to measure the amount of time-of-day discrepancy and can include a first portion to be detected that can be detected by the first object detection section and a second portion to be detected that can be detected by the second object detection section.

The first object detection section can be used as a stereo camera that captures the object as two stereo camera images having predetermined parallax, the second detection section can be used as a millimeter wave radar that detects the object with millimeter-wave radio waves and acquires a radar image, the signal processing apparatus can further include a reference time-of-day generation section adapted to generate a reference time of day, and each of the stereo camera image and the radar image can include time-of-day information that includes the reference time of day at a timing when the image is generated.

The signal processing apparatus can include a distance image calculation section adapted to calculate, on a pixel-by-pixel basis, a distance to the predetermined target on the basis of the two images having the predetermined parallax included in the stereo camera image and generate a distance image having the distance as a pixel value, a distance image target detection section adapted to detect, as a stereo camera image distance, a distance to the predetermined target in the distance image together with time-of-day information of the corresponding stereo camera image, and a radar image target detection section adapted to detect a radar image distance, a distance to the predetermined target based on the radar image, together with time-of-day information of the corresponding radar image. The time-of-day discrepancy detection section can be caused to detect, as an amount of time-of-day discrepancy, a difference between the time-of-day information of the stereo camera image and the time-of-day information of the radar image whose stereo camera image distance and radar image distance match.

The signal processing apparatus can further include a stereo camera image target position detection section adapted to detect a coordinate position of the predetermined target in the stereo camera image, in which the distance image target detection section can be caused to identify, in the distance image, distance information of the coordinate position of the predetermined target detected by the stereo camera image target position detection section as a stereo camera image distance, a distance to the predetermined target, and detect the distance information together with time-of-day information of the corresponding stereo camera image, and the radar image target detection section can be caused to detect a distance with a high response intensity in the radar image within a close range of a position identified not only by the coordinate position of the predetermined target detected by the stereo camera image target position detection section but also by the stereo camera image distance as a radar image distance, a distance to the predetermined target, together with the time-of-day information of the corresponding radar image.

The predetermined target can include a radar reflector whose reflectance of radar waves of the millimeter wave radar is higher than a predetermined value and a marker recognizable with the stereo camera image.

The signal processing apparatus can further include a stereo camera image target position detection section adapted to detect the coordinate position of the predetermined target in the stereo camera image and a reflecting cross-sectional area target position detection section adapted to detect a position of the predetermined target in the radar image on the basis of a reflecting cross-sectional area distribution in the radar image, in which the distance image target detection section can be caused to identify, in the distance image, distance information of the coordinate position of the predetermined target as a stereo camera image distance, a distance to the predetermined target, and detect the distance information together with time-of-day information of the corresponding stereo camera image, and the radar image target detection section can be caused to detect, as a radar image distance, a distance corresponding to the position of the predetermined target in the radar image detected by the reflecting cross-sectional area target position detection section together with time-of-day information of the corresponding radar image.

The distance image calculation section, the distance image target detection section, the radar image target detection section, and the time-of-day discrepancy detection section can be caused to detect an amount of time-of-day discrepancy by causing them to repeatedly generate the distance image at predetermined time intervals, detect the stereo camera image distance together with the time-of-day information of the corresponding stereo camera image, and detect the radar image distance together with the time-of-day information of the corresponding radar image.

The predetermined target can include a preceding vehicle's license plate or a road sign.

The first object detection section can be used as a stereo camera that captures the object as two stereo camera images having predetermined parallax, the second object detection section can include LIDAR (Light Detection and Ranging, Laser Imaging Detection and Ranging) that detects the object with a laser beam and captures the object as an image responsive to a reflection intensity of the laser beam, the signal processing apparatus can further include a reference time-of-day generation section adapted to generate a reference time of day, and each of the stereo camera images and a LIDAR image captured by the LIDAR can includes time-of-day information that includes the reference time of day at a timing when the image is generated.

The signal processing apparatus can include a distance image calculation section adapted to calculate, on a pixel-by-pixel basis, a distance to a subject based on predetermined parallax from the stereo camera image and generate a distance image having the distance as a pixel value, a distance image target detection section adapted to detect a stereo camera image distance based on the distance image, a distance to the predetermined target, together with time-of-day information of the corresponding stereo camera image, and a LIDAR image target detection section adapted to detect a LIDAR image distance based on the LIDAR image, a distance to the predetermined target, together with time-of-day information of the corresponding LIDAR image, in which the time-of-day discrepancy detection section can be caused to detect, as an amount of time-of-day discrepancy, a difference between the time-of-day information of the stereo camera image and the time-of-day information of the LIDAR image whose stereo camera image distance and LIDAR image distance match.

The signal processing apparatus can include a stereo camera image target position detection section adapted to detect a coordinate position of the predetermined target in the stereo camera image, in which the distance image target detection section can be caused to identify, in the distance image, distance information of the coordinate position of the predetermined target detected by the stereo camera image target position detection section as a stereo camera image distance, a distance to the predetermined target, and detect the distance information together with the time-of-day information of the corresponding stereo camera image, the LIDAR image can include a LIDAR reflection intensity image having, as a pixel value of each pixel, a reflection intensity of the laser beam, and a LIDAR distance image that includes a distance image found by a ToF (Time of Flight) method on the basis of a round-trip time of the laser beam to a subject. The LIDAR image target detection section can be caused to consider, from the LIDAR reflection intensity image, a position with a particularly high reflection intensity as a position of the predetermined target and detect a distance of the position in the corresponding LIDAR distance image as a LIDAR image distance, a distance to the predetermined target, together with time-of-day information of the image responsive to the reflection intensity of the laser beam.

The predetermined target can include a laser reflector whose laser reflection ratio of the LIDAR is higher than a predetermined value and a marker recognizable with the stereo camera image.

The time-of-day discrepancy detection section may be caused to find a plurality of the time-of-day discrepancies and detect an amount of time-of-day discrepancy through a statistical process.

A signal processing method of an aspect of the present disclosure is a signal processing method that includes a first object detection process adapted to detect an object, a second object detection process adapted to detect an object in a manner different from the first object detection process, and a time-of-day discrepancy detection section adapted to detect, as an amount of time-of-day discrepancy, a time-of-day discrepancy between a first time of day when a predetermined target is detected by the first object detection process and a second time of day when the predetermined target is detected by the second object detection process.

A program of an aspect of the present disclosure causes a computer to perform processes including a first object detection section adapted to detect an object, a second object detection section adapted to detect an object and different from the first object detection section, and a time-of-day discrepancy detection section adapted to detect, as an amount of time-of-day discrepancy, a time-of-day discrepancy between a first time of day when a predetermined target is detected by the first object detection section and a second time of day when the predetermined target is detected by the second object detection section.

A mobile object of an aspect of the present disclosure is a mobile object that includes a first object detection section adapted to detect an object, a second object detection section adapted to detect an object and different from the first object detection section, and a time-of-day discrepancy detection section adapted to detect, as an amount of time-of-day discrepancy, a time-of-day discrepancy between a first time of day when a predetermined target is detected by the first object detection section and a second time of day when the predetermined target is detected by the second object detection section.

A signal processing system of an aspect of the present disclosure is a signal processing system that includes a predetermined target and a signal processing apparatus, in which the signal processing apparatus includes a first object detection section adapted to detect an object, a second object detection section adapted to detect an object and different from the first object detection section, and a time-of-day discrepancy detection section adapted to detect, as an amount of time-of-day discrepancy, a time-of-day discrepancy between a first time of day when the predetermined target is detected by the first object detection section and a second time of day when the predetermined target is detected by the second object detection section, in which the predetermined target includes a first portion to be detected that can be detected by the first object detection section and a second portion to be detected that can be detected by the second object detection section.

In an aspect of the present disclosure, an object is detected by a first object detection section, and the object is detected by a second object detection section different from the first object detection section. A time-of-day discrepancy between a first time of day when a predetermined target is detected by the first object detection section and a second time of day when the predetermined target is detected by the second object detection section is detected as an amount of time-of-day discrepancy.

Advantageous Effect of Invention

An aspect of the present disclosure ensures improved accuracy in detection results by properly synchronizing and combining a plurality of detection results acquired from a plurality of object detection sensors.

DESCRIPTION OF EMBODIMENTS

Figure 1:
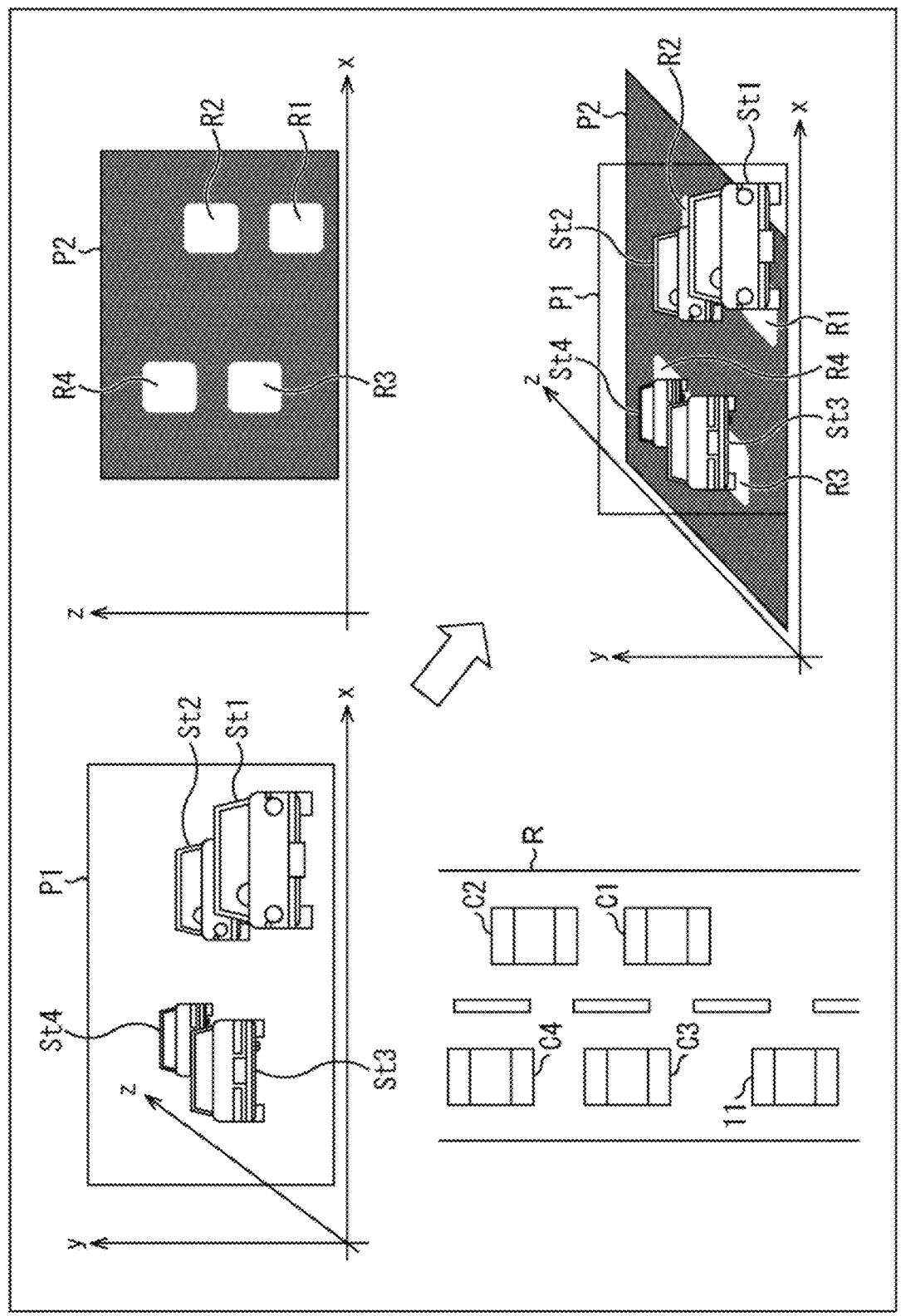
FIG. 1 is a diagram describing an overview of the present disclosure.

A detailed description will be given below of a preferred embodiment of the present disclosure with reference to attached drawings. It should be noted that components having substantially the same functional configuration will be denoted by the same reference numerals in the present specification and the drawings and that redundant description will be omitted.

A description will be given below of a mode for carrying out the present technology. The description will be given in the following order:

1. Overview of the present disclosure
2. Preferred embodiment of the present disclosure
3. Application example
4. Modification example
5. Example of performing processes by software 1. Overview of the Present Disclosure A mobile object of the present disclosure is a mobile object that recognizes surrounding conditions of its own vehicle with high accuracy and propels itself in accordance with recognition results. In the following pages, a description will be given, as an example, of a case in which the mobile object of the present disclosure is a vehicle. However, it is needless to say that the mobile object of the present disclosure may be other than a vehicle as long as it is a mobile object.

The mobile object of the present disclosure includes a sensor section that includes a millimeter wave radar and a stereo camera, thus monitoring a forward scene in a traveling direction and outputting, as surrounding information of its own vehicle, a detected object distance image produced by combining a radar image acquired by the millimeter wave radar and the stereo camera image captured with the stereo camera.

The mobile object of the present disclosure, on the basis of detected object distance image, for example, recognizes surrounding information of its own vehicle and propels itself on the basis of recognition results.

Going into more detail, it is assumed, for example, that when a vehicle 11, an own vehicle, illustrated at the bottom left in FIG. 1 is traveling upward in the figure on a left lane on a road R, vehicles C1 and C2 in the order closer to the vehicle 11 are traveling downward in the figure on an oncoming lane and that vehicles C3 and C4 are also present on the same lane as the vehicle 11 and in front of the vehicle 11 that are traveling upward in the figure. It should be noted that FIG. 1 is a diagram illustrating a relationship between the vehicle 11 and its surrounding vehicles when the vehicle 11 is seen from above.

When the vehicles are traveling as illustrated at the bottom left in FIG. 1, the stereo camera of the vehicle 11 captures, for example, a stereo camera image P1 as illustrated at the top left in FIG. 1. That is, the stereo camera image P1 is coordinate system information having, as an X axis, a horizontal direction orthogonal to the traveling direction of the vehicle 11, as a Y axis, a vertical direction orthogonal to the traveling direction of the vehicle 11, and as a Z axis, the traveling direction of the vehicle 11.

That is, the stereo camera image P1 is an image with depth in the Z direction as seen from an XY plane as illustrated at the top left in FIG. 1, depicting the vehicles C1 and C2 traveling on the right and in front in the figure on the oncoming lane as images St1 and St2 and the vehicles C3 and C4, preceding vehicles on the left and in front, as images St3 and St4.

On the other hand, a radar image P2 acquired by the millimeter wave radar is coordinate system information having, as an X axis, a horizontal direction orthogonal to the traveling direction of the vehicle 11 and, as a Z axis, the traveling direction of the vehicle 11, as illustrated at the top right in FIG. 1.

That is, the radar image P2 is an image as seen from an XZ plane as illustrated at the top right in FIG. 1, depicting radar images R1 and R2 responsive to response intensities of the vehicles C1 and C2 traveling on the right and in front in the figure on the oncoming lane and radar images R3 and R4 responsive to response intensities of the vehicles C3 and C4, preceding vehicles on the left and in front.

Then, combining the stereo camera image P1 and the radar image P2 allows for mapping onto a coordinate system of a real space as illustrated at the bottom right in FIG. 1, thus ensuring more accurate and more robust identification of the positions of the surrounding vehicles C1 to C4 with respect to the forward scene in the traveling direction as seen from the vehicle 11.

That is, pieces of information of the radar images R1 to R4 are superimposed to correspond to the images St1 to St4, respectively, at the bottom right in FIG. 1, and mapping onto the coordinate system of the real space using mutual information of the images St1 to St4 of the stereo camera image and the radar images R1 to R4 allows for more accurate and more robust acquisition of position information of the surrounding vehicles C1 to C4 with respect to the forward scene in the traveling direction as seen from the vehicle 11.

Incidentally, in the case where the vehicles C1 to C4 are detected from a stereo camera image and a radar image and mapped onto the coordinate system of the real space, it is necessary to use images captured (acquired) at the same time of day as the stereo camera image and the radar image.

If the stereo camera image and the radar image are captured (acquired) at different times of day, and in the case where the vehicle 11 or the vehicles C1 to C4 to be captured are moving, the positions of the targets appearing in the stereo camera image and the radar image deviate from each other, thus making it impossible to achieve proper mapping.

In this regard, mapping can be achieved by electrically matching the timings and assuming that the images are captured at the same time of day and not taking into consideration a discrepancy in capturing times of day. However, there has been a limitation on the accuracy.

Also, a technology is available that matches times of day by assigning time stamps based on highly accurate times of day such as GPS (Global Positioning System) to captured images. However, it is not practical to regularly use a time stamp assignment function based on a highly accurate time of day. Even if time stamps are assigned, time stamps are provided after data is sent from a sensor. As a result, it is impossible to consider latency in buffered transmission.

Further, although a clock synchronization technology is available, it is common that clocks of the respective object detection sensors are independent of each other in a system that uses a plurality of object detection sensors. As a result, a time-of-day discrepancy occurs due to drifting of each of internal clocks.

Also, even if the respective clocks of the plurality of object detection sensors are not independent of each other, a delay is present that is caused by a buffer that distributes the clocks to the plurality of object detection sensors, respectively, thus resulting in time-of-day discrepancies caused by drifting of the clocks.

Further, it is assumed that the time of day when a radar image is acquired by the millimeter wave radar is denoted as a time of day $t\_radar\_1$, the time of day when an image is captured with the left stereo camera is denoted as a time of day $t\_lcamera\_1$, and the time of day when an image is captured with the right stereo camera is denoted as a time of day $t\_rcamera\_1$.

Also, it is assumed that a reference time of day is constantly generated and that a time $t\_radar\_s$ is added when the radar image undergoes signal processing. Similarly, a time of day $t\_lcamera\_s$ is added when a left camera image is output following signal processing of the left camera image, and a time of day $t\_rcamera\_s$ is added when a right camera image is output following signal processing.

It is assumed that processing time associated with the signal processing of the radar image is denoted as processing time $t\_radar\_p$, processing time associated with the signal processing of the left camera image is denoted as processing time $t\_lcamera\_p$, and processing time associated with the signal processing of the right camera image is denoted as processing time $t\_rcamera\_p$.

The actual capturing (acquisition) time of day of the radar image and the stereo camera image (time of day when radar waves are received in the case of the millimeter wave radar) when the radar image and the stereo camera image are obtained are expressed by the following formulas (1) to (3) from the reference time of day and the relationship between the processing times associated with the respective processing tasks:

$$t\_radar\_1 = t\_radar\_s - t\_radar\_p \quad (1)$$

$$t\_lcamera\_1 = t\_lcamera\_s - t\_lcamera\_p \quad (2)$$

$$t\_rcamera\_1 = t\_rcamera\_s - t\_rcamera\_p \quad (3)$$

However, each signal processing task and processing associated with addition of time-of-day information, and further errors arising from various unrecognizable causes in a transfer path through which the radar image and the stereo camera image are transferred are included. As a result, the capturing (acquisition) time of day (time of day when radar waves are received in the case of the millimeter wave radar) is expressed as illustrated by the following formulas (4) to (6):

$$t\_radar\_1 = t\_radar\_s - t\_radar\_p + error\_radar \quad (4)$$

$$t\_lcamera\_1 = t\_lcamera\_s - t\_lcamera\_p + error\_lcamera \quad (5)$$

$$t\_rcamera\_1 = t\_rcamera\_s - t\_rcamera\_p + error\_rcamera \quad (6)$$

That is, error terms error_radar, error_lcamera, and error_rcamera cannot be measured. Therefore, it is difficult to identify the capturing (acquisition) time of day (radar wave reception time of day in the case of the radar), thus resulting in a time-of-day discrepancy.

It should be noted that time here need not necessarily be an absolute time and is only required to be an equally spaced pulse (so-called clock) and its number of counts.

Therefore, it is necessary to achieve synchronization such that the time-of-day discrepancy between the captured (acquired) stereo camera image and radar image is properly corrected and that correspondence between the respectively detected objects is consistent.

That is, in order to ensure that each of a stereo camera image captured with the stereo camera and a radar image produced by the millimeter wave radar detects the same vehicle at the same position, it is important to use the stereo camera image and the radar image of the same time of day such that the same vehicle is mapped onto the same position.

For this reason, the present disclosure detects, in advance and as an amount of time-of-day discrepancy, a time-of-day discrepancy associated with acquisition of a radar image and a stereo camera image while at the same time changing a distance through calibration and corrects the time-of-day discrepancy by using information of the amount of time-of-day discrepancy found in advance through calibration, thus making it possible to obtain the stereo camera image and the radar image of the same time of day.

Figure 2:
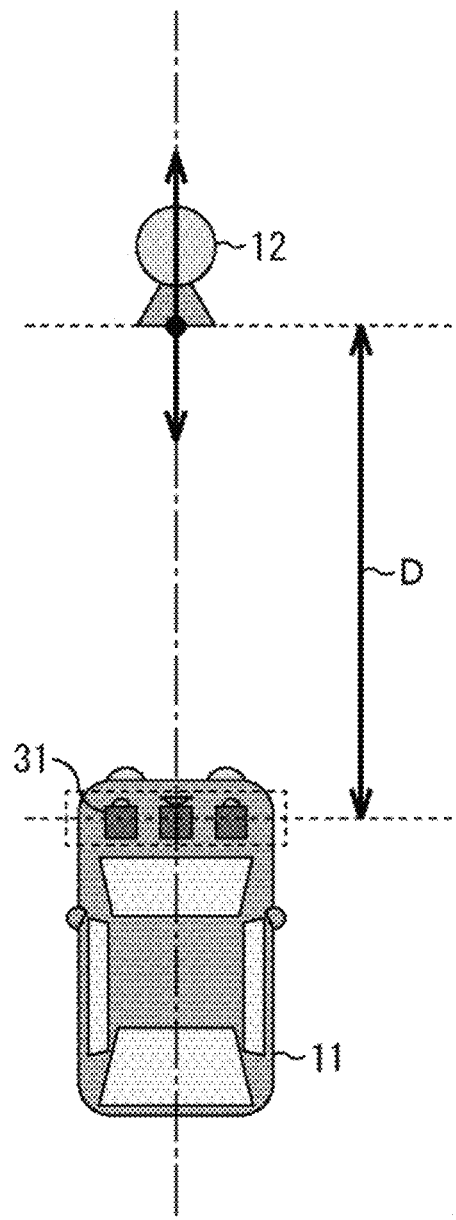
FIG. 2 is a diagram describing a positional relationship between a vehicle and a target.

Overview of how the Amount of Time-of-Day Discrepancy is Found Between the Time of Day when the Stereo Camera Image is Detected and the Time of Day when the Radar Image is Detected by the Millimeter Wave Radar The calibration system of the present disclosure includes, for example, the vehicle 11 and a target 12 as illustrated in FIG. 2. The vehicle 11 includes a sensor section 31 that monitors a forward scene as a monitoring region and has a millimeter wave radar and a stereo camera. The target 12 is provided in the monitoring region.

The calibration system that includes the vehicle 11 and the target 12 as described above finds an amount of time-of-day discrepancy, a difference in times of day, from pieces of time-of-day information from which detection results of the millimeter wave radar and the stereo camera are acquired, by using the detection results of the millimeter wave radar and the stereo camera, thus storing the amount of time-of-day discrepancy in the vehicle 11. When generating a normal detected object distance image, the vehicle 11 corrects the time-of-day discrepancy associated with the acquisition of the radar image of the millimeter wave radar and the stereo camera image of the stereo camera by using the amount of time-of-day discrepancy found through the calibration process, thus generating a detected object distance image.

Overview of the Configuration of the Sensor Section

Figure 3:
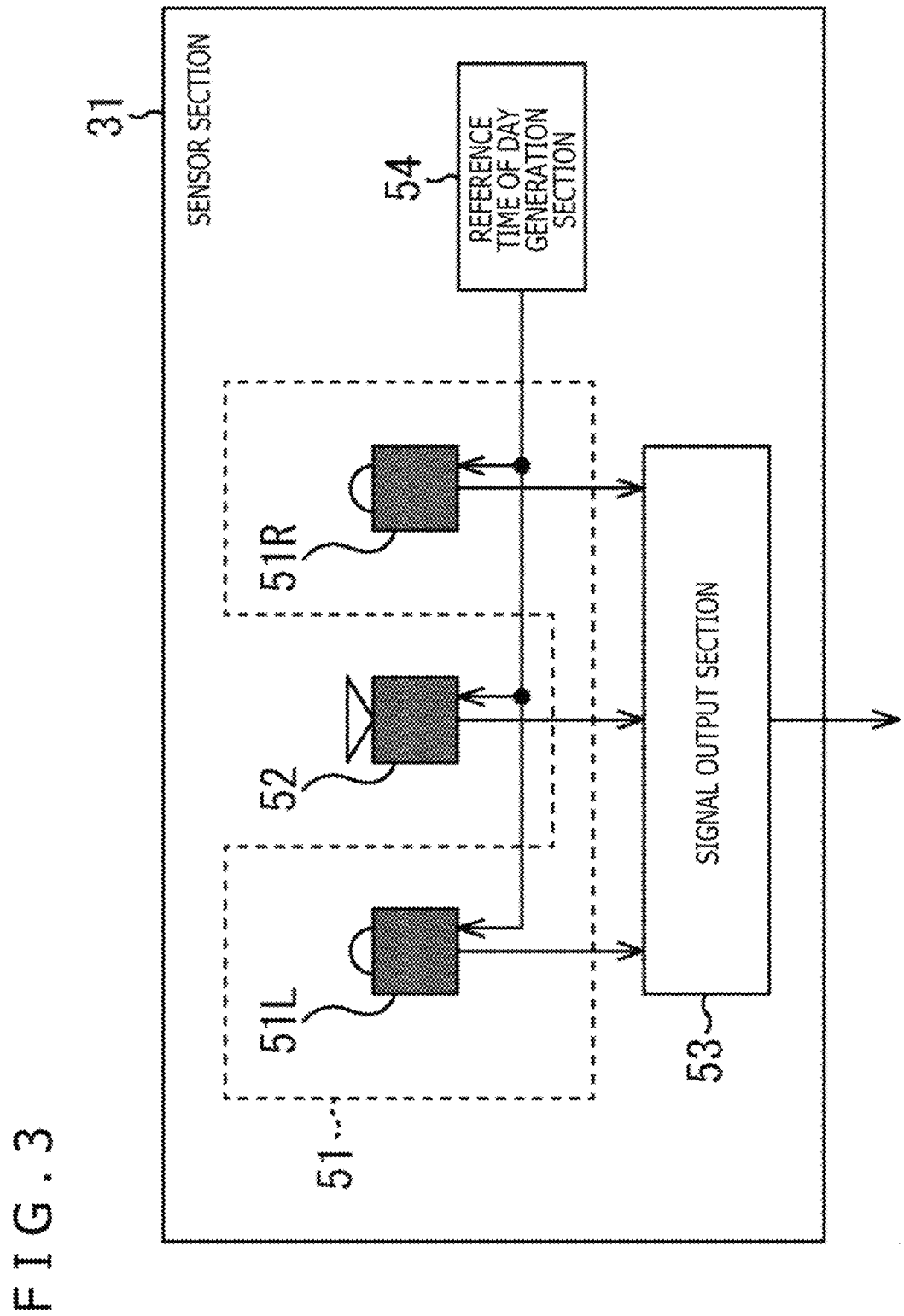
FIG. 3 is a diagram describing a time-of-day discrepancy between a stereo camera image and a radar image.

A description will be given here of the overview of the configuration of the sensor section 31 with reference to FIG. 3.

The sensor section 31 includes a stereo camera 51, a millimeter wave radar 52, a signal output section 53, and a reference time of day generation section 54.

The stereo camera 51 includes cameras 51L and 51R that capture images having predetermined horizontal parallax, capturing a forward scene in front of the vehicle 11, assigning time-of-day information that includes a time stamp corresponding to the reference time of day supplied from the reference time of day generation section 54, and outputting the images to the signal output section 53.

The millimeter wave radar 52 emits radio waves in the millimeter wave band into the monitoring region, measures the direction and distance to an object to be detected, for example, from a round-trip time of radar waves by detecting reflected waves from the object to be detected, generates a radar image, assigns time-of-day information that includes a time stamp corresponding to the reference time of day supplied from the reference time of day generation section 54, and outputs the radar image to the signal output section 53.

The signal output section 53 outputs, to an outside-vehicle information detection section 141 of a detection section 131 of an automatic driving control section 112 of a vehicle control system 100 which will be described with reference to FIG. 6, the stereo camera image and the radar image to which time stamps, time-of-day information indicating the detection times, have been assigned.

The reference time of day generation section 54 generates a reference time of day and outputs the time of day to the stereo camera 51 and the millimeter wave radar 52.

Configuration Example of the Target

A description will be given next of a configuration example of the target 12 used during calibration with reference to FIG. 4.

The target 12 is installed at an arbitrary height that can be detected by the stereo camera 51 and the millimeter wave radar 52 of the sensor section 31.

Also, the target 12 need only be an object that reflects radar waves emitted by the millimeter wave radar 52 and can be captured with the stereo camera 51, and specifically, it is preferable that the target 12 should be an object that includes a metal and does not reflect light to such an extent that distance measurement of the stereo camera remains unaffected by light reflection and that the target 12 should, for example, be matt-finished or have a piece of paper affixed thereto.

Figure 4:
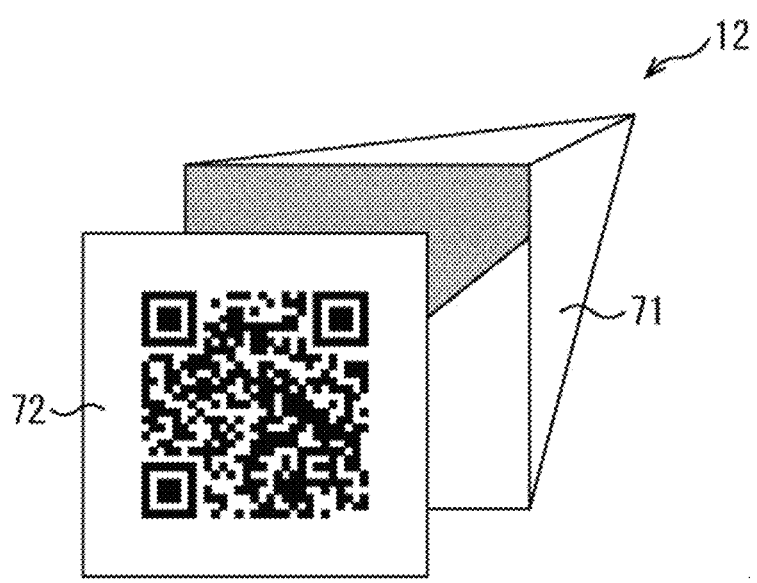
FIG. 4 is a diagram describing a configuration example of a sensor section mounted to a vehicle of the present disclosure.

Further, the target 12 includes a radar reflector 71 having a metallic quadrangular pyramid whose rectangular surface is open as illustrated in FIG. 4 to reflect millimeter waves generated by the millimeter wave radar 52 at a reflection ratio higher than a predetermined reflection ratio.

Also, the open surface of the quadrangular pyramid of the target 12 faces the direction of the millimeter wave radar 52 of the sensor section 31, and a marker 72 that includes a sheet of paper with a pattern printed on the open surface is affixed to the target 12. A QR (Quick Response) code, for example, may be used as this pattern.

Thanks to the configuration as described above, the target 12 reflects millimeter wave radio waves emitted from the millimeter wave radar 52, thus allowing for detection by the millimeter wave radar 52. Further, the marker 72 is captured with the stereo camera 51, thus allowing both the millimeter wave radar 52 and the stereo camera 51 to measure the distance.

It should be noted that the radar reflector 71 included in the target 12 is not limited in shape to quadrangular pyramid and may be in any shape such as triangular pyramid or sphere as long as the target 12 can reflect transmitted millimeter waves toward the direction in which the millimeter wave radar 52 can receive the millimeter waves.

Also, although the marker 72 is affixed that includes a sheet of paper with a pattern printed thereon for higher distance measurement accuracy of the stereo camera 51, the rectangular surface of the radar reflector 71 may be filled up so that a pattern is directly printed, or a metallic object included in the radar reflector 71 may be simply matte-finished in order to prevent light reflection.

Further, in the case where it is difficult to treat the target 12 in such a manner as not to reflect light, a board with a suitable pattern printed thereon, etc. such as an object appearing in the stereo camera view, whose position from the target 12 is known (hereinafter referred to as a camera target), may be, for example, used.

It should be noted, however, that, in this case, when the target 12 is moved as will be described later, the target 12 should be moved in such a manner that the positional relationship between the radar reflector 71 and the camera target remains unchanged or that the positional relationship at a predetermined time of day can be found.

Overview of how the Amount of Time-of-Day Discrepancy is Found

A description will be given next of an overview of how the amount of time-of-day discrepancy is found through a calibration process using the sensor section 31 of the vehicle 11 and the target 12 described with reference to FIGS. 2 to 4 with reference to FIG. 5.

Figure 5:
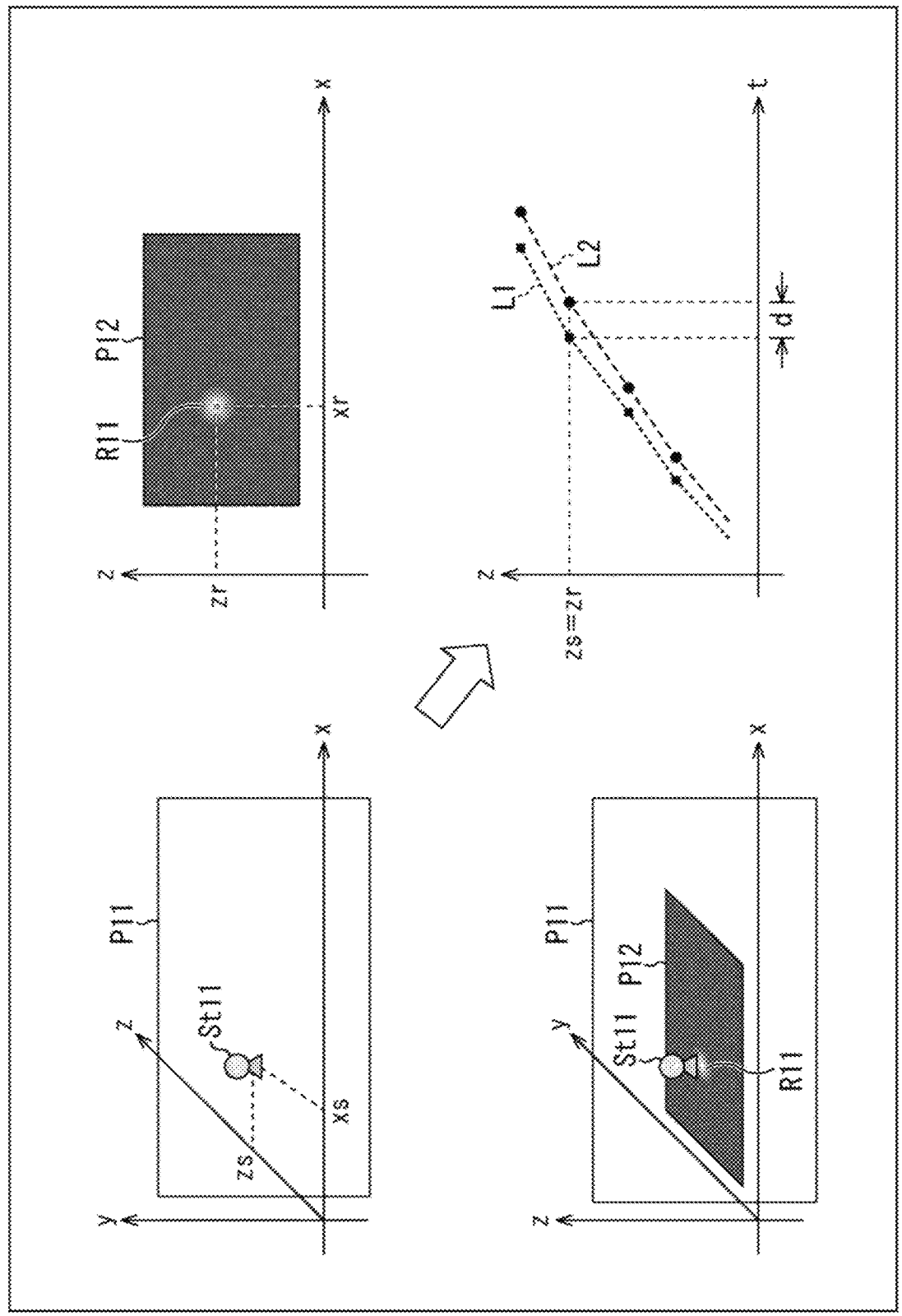
FIG. 5 is a diagram describing a configuration example of a target of the present disclosure.

For example, in the case where a stereo camera image P11 as illustrated at the top left in FIG. 5 is captured, an image St11 of the target 12, a target object, is detected as (horizontal coordinate, distance coordinate)=(xs, zs) in the stereo camera image P11.

In the calibration process, on the other hand, in the case where a radar image P12 as illustrated at the top right in FIG. 5, for example, is acquired, a radar image R11 of the target 12, a target object, is detected as (horizontal coordinate, distance coordinate)=(xr,zr) in the radar image P12.

It should be noted that if the stereo camera image P11 and the radar image P12 at this time are those when the target 12 is present at the same position, respectively, a distance object detection image generated on the basis of the stereo camera image P11 and the radar image P12 is that illustrated at the bottom left in FIG. 5. As a result, the image St11 of the target 12 and the radar image R11 are present at a perfectly matching position.

Accordingly, the difference in time of day between the stereo camera image P11 illustrated at the top left in FIG. 5 and the radar image P12 illustrated at the top right in FIG. 5 whose positions in the real space of the target 12 match is found as an amount of time-of-day discrepancy.

The graphs at the bottom right in FIG. 5 depict waveforms, each illustrating a relationship between a distance Z (=D) between the vehicle 11 and the target 12 in FIG. 2 and a time of day when the stereo camera image P11 is detected and a relationship between the distance Z and a time of day when the radar image P12 is detected through the calibration process.

Here, at the bottom right in FIG. 5, a waveform L1 is a graph illustrating the relationship between the distance Z (=D) and the time of day when the radar image P12 is detected, and a waveform L2 is a graph illustrating the relationship between the distance Z (=D) and the time of day when the stereo camera image P11 is detected.

Then, the difference between the times of day of the waveforms L1 and L2 at a distance zs=zr is found as an amount of time-of-day discrepancy d.

By correcting the discrepancy between time-of-day information when a stereo camera image is captured with the stereo camera 51 and time-of-day information when a radar image is detected by the millimeter wave radar using this amount of time-of-day discrepancy d, it is possible to combine the stereo camera image and the radar image that are in synchronism and generate a distance object detection image.

That is, the calibration process finds, in advance, an amount of time-of-day discrepancy between time-of-day information when a stereo camera image is captured with the stereo camera 51 and time-of-day information when a radar image is detected by the millimeter wave radar 52. Then, when an actual detected object distance image is generated, the time-of-day discrepancy between time-of-day information when the stereo camera image is captured with the stereo camera 51 and time-of-day information when the radar image is detected by the millimeter wave radar 52 is corrected, thus combining the stereo camera image and the radar image in a synchronous manner and generating a highly accurate detected object distance image.

2. Preferred Embodiment of the Present Disclosure

Configuration Example of the Vehicle Control System for Controlling a Vehicle

A description will be given next of a detailed configuration example of a vehicle control system for controlling the vehicle 11 with reference to FIG. 6. FIG. 6 is a block diagram illustrating a configuration example of schematic functions of a vehicle control system 100, an example of a mobile object control system to which the present technology is applicable.

It should be noted that, hereinafter, in the case where a distinction is made between a vehicle in which the vehicle control system 100 is provided and another vehicle, the vehicle will be referred to as an own vehicle.

The vehicle control system 100 includes an input section 101, a data acquisition section 102, a communication section 103, in-vehicle equipment 104, an output control section 105, an output section 106, a driving unit control section 107, a driving unit system 108, a body unit control section 109, a body unit system 110, a storage section 111, and an automatic driving control section 112. The input section 101, the data acquisition section 102, the communication section 103, the output control section 105, the driving unit control section 107, the body unit control section 109, the storage section 111, and the automatic driving control section 112 are connected to each other via a communication network 121. The communication network 121 includes, for example, a vehicle-mounted communication network compliant with an arbitrary standard such as CAN (Controller Area Network), LIN (Local Interconnect Network), LAN (Local Area Network), or FlexRay (registered trademark), a bus, and so on. It should be noted that there are cases in which the respective sections of the vehicle control system 100 are connected directly to each other without going via the communication network 121.

It should be noted that, hereinafter, in the case where the respective sections of the vehicle control system 100 communicate with each other via the communication network 121, no mention will be made of the communication network 121. For example, in the case where the input section 101 and the automatic driving control section 112 communicate via the communication network 121, the description that the input section 101 and the automatic driving control section 112 communicate with each other will be simply described.

The input section 101 includes apparatuses used by passengers to input various pieces of data, instructions, and so on. For example, the input section 101 includes not only manipulation devices such as touch panel, buttons, microphone, switches, and levers but also manipulation devices that allow data input in a manner other than manual operation such as voice, gesture, and so on. Also, for example, the input section 101 may be a remote control apparatus that uses infrared or other radio waves, mobile equipment that supports manipulation of the vehicle control system 100, or external connection equipment such as wearable equipment. The input section 101 generates an input signal on the basis of data, instruction or other information input by a passenger and supplies the signal to each section of the vehicle control system 100.

The data acquisition section 102 includes a variety of sensors and other pieces of equipment for acquiring data to be used for processing performed by the vehicle control system 100 and supplies acquired data to each section of the vehicle control system 100.

For example, the data acquisition section 102 includes a variety of sensors for detecting the state of the own vehicle and other information. Specifically, for example, the data acquisition section 102 includes not only a gyro sensor, an acceleration sensor, an inertia measuring unit (IMU) but also sensors and other pieces of equipment for detecting an amount of manipulation of an accelerator pedal, an amount of manipulation of a brake pedal, a steering angle of a steering wheel, an engine rotation speed, a motor rotation speed, a wheel rotation speed, or other information.

Also, for example, the data acquisition section 102 includes a variety of sensors for detecting outside information of the own vehicle. Specifically, for example, the data acquisition section 102 includes a capturing apparatus such as ToF (Time of Flight) camera, stereo camera, monocular camera, infrared camera, or other type of camera. Also, for example, the data acquisition section 102 includes an environmental sensor for detecting weather or meteorology and a surrounding information detection sensor for detecting surrounding objects of the own vehicle. The environmental sensor includes, for example, a rain drop sensor, a mist sensor, a sunshine sensor, a snow sensor, and so on. The surrounding information detection sensor includes, for example, an ultrasonic sensor, a radar, a LIDAR (Light Detection and Ranging, Laser Imaging Detection and Ranging), a sonar, and so on.

Further, for example, the data acquisition section 102 includes a variety of sensors for detecting the current position of the own vehicle. Specifically, for example, the data acquisition section 102 includes a GNSS (Global Navigation Satellite System) receiver for receiving a GNSS signal from a GNSS satellite and so on.

Also, for example, the data acquisition section 102 includes a variety of sensors for detecting in-vehicle information. Specifically, for example, the data acquisition section 102 includes an image capturing apparatus for capturing an image of the driver, a biological sensor for detecting biological information of the driver, a microphone for collecting sounds in a vehicle's compartment, and so on. The biological sensor is provided on a seat surface, a steering wheel, or other location to detect biological information of a passenger seated on the seat or the driver holding the steering wheel. It should be noted that the data acquisition section 102 includes the sensor section 31 that includes the stereo camera 51 and the millimeter wave radar 52 described with reference to FIG. 3. Also, detailed configurations of the stereo camera 51 and the millimeter wave radar 52 will be described later with reference to FIG. 7.

The communication section 103 communicates with not only the in-vehicle equipment 104 but also various pieces of equipment outside the vehicle, servers, base stations, and so on, sends data supplied from each section of the vehicle control system 100, and supplies received data to each section of the vehicle control system 100. It should be noted that the communication protocol supported by the communication section 103 is not particularly limited and that the communication section 103 may support a plurality of types of communication protocols.

For example, the communication section 103 communicates wirelessly with the in-vehicle equipment 104 through wireless LAN, Bluetooth (registered trademark), NFC (Near Field Communication), WUSB (Wireless USB), or other protocol. Also, the communication section 103 communicates in a wired manner with the in-vehicle equipment 104 via a connection terminal (and a cable, if necessary) that is not illustrated, through USB (Universal Serial Bus), HDMI (registered trademark) (High-Definition Multimedia Interface), MHL (Mobile High-definition Link), or other protocol.

Further, for example, the communication section 103 communicates with a piece of equipment (e.g., application server or control server) present on an external network (e.g., Internet, cloud network, or network specific to a carrier) via base stations or access points. Also, for example, the communication section 103 communicates with a terminal (e.g., pedestrian's or store's terminal or MTC (Machine Type Communication) terminal) present near the own vehicle by using P2P (Peer To Peer) technology. Further, for example, the communication section 103 engages in V2X communication such as vehicle-to-vehicle communication, vehicle-to-infrastructure communication, vehicle-to-home communication, vehicle-to-pedestrian communication, and so on. Also, for example, the communication section 103 includes a beacon reception section, receiving radio waves or electromagnetic waves emitted from a wireless station or other piece of equipment installed on a road and acquiring information such as a current position, traffic jams, traffic restrictions, or a required time to a destination.

The in-vehicle equipment 104 includes a piece of mobile equipment or wearable equipment of a passenger, a piece of information equipment loaded into or installed in the own vehicle, a navigation apparatus for searching for a route to an arbitrary destination, and so on.

The output control section 105 controls output of various pieces of information to the passengers of the own vehicle and to outside equipment. For example, the output control section 105 generates an output signal including at least one of visual information (e.g., image data) or auditory data (e.g., sound data) and supplies the signal to the output section 106, thus controlling output of visual and auditory information from the output section 106. Specifically, for example, the output control section 105 combines image data captured with different capturing apparatuses of the data acquisition section 102, generating a bird's eye image or a panoramic image and supplying an output signal including the generated image to the output section 106. Also, for example, the output control section 105 generates sound data including a warning sound, a warning message, or other information to warn of collision, contact, entry into a hazardous region, or other hazard and supplies an output signal including the generated sound data to the output section 106.

The output section 106 includes an apparatus capable of outputting visual and auditory information to the passengers of the own vehicle and to equipment outside the vehicle. For example, the output section 106 includes a display apparatus, an instrument panel, an audio speaker, a headphone, a wearable device such as goggle-type displays worn by the passengers, a projector, a lamp, and so on. The display apparatus included in the output section 106 may be not only an apparatus having an ordinary display but also, for example, headup display, transmissive display, or an apparatus for displaying visual information in the field of view of the driver such as apparatus having an AR (Augmented Reality) display function.

The driving unit control section 107 generates various types of control signals and supplies these signal to the driving unit system 108, thus controlling the driving unit system 108. Also, the driving unit control section 107 supplies, as necessary, control signals to each section other than the driving unit system 108, thus notifying the state of controlling the driving unit system 108 or other information.

The driving unit system 108 includes a variety of apparatuses related to a driving unit of the own vehicle. For example, the driving unit system 108 includes a driving force generation apparatus for generating a driving force of an internal combustion engine, a driving motor, or other mechanism, a driving force transmission mechanism for transmitting the driving force to wheels, a steering mechanism for adjusting a steering angle, a braking apparatus for generating a braking force, ABS (Antilock Brake System), ESC (Electronic Stability Control), an electric power steering apparatus, and so on.

The body unit control section 109 generates various types of control signals and supplies these signals to the body unit system 110, thus controlling the body unit system 110. Also, the body unit control section 109 supplies, as necessary, control signals to each section other than the body unit system 110, thus notifying the state of controlling the body unit system 110 or other information.

The body unit system 110 includes various types of apparatuses of the body unit provided on the vehicle body. Among examples of such apparatuses include a keyless entry system, a smart key system, a power window apparatus, a power seat, a steering wheel, an air-conditioning apparatus, and various types of lamps (e.g., headlights, backlights, brake lights, turn signals, fog lights).

The storage section 111 includes, for example, magnetic storage devices, semiconductor storage devices, optical storage devices, and magneto-optical storage devices such as a ROM (Read Only Memory), a RAM (Random Access Memory), and an HDD (Hard Disc Drive). The storage section 111 stores various types of programs used by each section of the vehicle control system 100. For example, the storage section 111 stores map data ranging from a 3D high-accuracy map such as a dynamic map to a global map with lower accuracy than the high-accuracy map covering a wide area and a local map including surrounding information of the own vehicle.

The automatic driving control section 112 performs control related to automatic driving such as autonomous driving or driving assistance. Specifically, for example, the automatic driving control section 112 performs coordinated control intended to realize an ADAS (Advanced Driver Assistance System) function including collision avoidance or collision relaxation of the own vehicle, follow-up cruising on the basis of vehicle-to-vehicle distance, constant vehicle speed cruising, collision warning of the own vehicle, or lane departure warning of the own vehicle. Also, for example, the automatic driving control section 112 performs coordinated control intended for automatic driving that permits autonomous cruising that does not rely on driver's maneuver. The automatic driving control section 112 includes a detection section 131, a self-position estimation section 132, a condition analysis section 133, a planning section 134, and an operation control section 135.

The detection section 131 detects various types of information required to control automatic driving. The detection section 131 includes the outside-vehicle information detection section 141, an in-vehicle information detection section 142, and a vehicle state detection section 143.

The outside-vehicle information detection section 141 performs a detection process of detecting outside information of the own vehicle on the basis of data or signals supplied from each section of the vehicle control system 100. For example, the outside-vehicle information detection section 141 performs processes of detecting, recognizing and tracking surrounding objects of the own vehicle and a detection process of detecting the distances to the objects. The objects to be detected include, for example, vehicles, persons, obstacles, structures, roads, traffic signals, traffic signs, and road markings. Also, for example, the outside-vehicle information detection section 141 performs a detection process of detecting a surrounding environment of the own vehicle. The surrounding environment to be detected includes, for example, weather, temperature, humidity, brightness, road surface condition, and so on. The outside-vehicle information detection section 141 supplies data indicating results of the detection processes to the self-position estimation section 132, a map analysis section 151, a traffic rule recognition section 152, a condition recognition section 153 of the condition analysis section 133, and an emergency avoidance section 171 of the operation control section 135, and so on.

The in-vehicle information detection section 142 performs a detection process of detecting in-vehicle information on the basis of data or signals supplied from each section of the vehicle control system 100. For example, the in-vehicle information detection section 142 performs processes of authenticating and recognizing the driver, processes of detecting the driver's states, passengers, and in-vehicle environments, and so on. The driver's states to be detected include a driver's physical condition, an awakening level, a concentration level, a fatigue level, a line of sight, and so on. The in-vehicle environments to be detected include, for example, temperature, humidity, brightness, odors, and so on. The in-vehicle information detection section 142 supplies data indicating results of the detection processes to the condition recognition section 153 of the condition analysis section 133, the emergency avoidance section 171 of the operation control section 135, and so on.

The vehicle state detection section 143 performs processes of detecting states of the own vehicle on the basis of data from each section of the vehicle control system 100 or signals. The own vehicle's states to be detected include, for example, a speed, an acceleration, a steering angle, presence or absence and details of a faulty condition, a state of a driving maneuver, power seat position and inclination, a door lock state, states of other pieces of vehicle-mounted equipment, and so on. The vehicle state detection section 143 supplies data indicating results of the detection processes to the condition recognition section 153 of the condition analysis section 133, the emergency avoidance section 171 of the operation control section 135, and so on.

The self-position estimation section 132 performs an estimation process of estimating the position, posture, and other information of the own vehicle on the basis of data or signals supplied from each section of the vehicle control system 100 such as the outside-vehicle information detection section 141 and the condition recognition section 153 of the condition analysis section 133. Also, the self-position estimation section 132 generates, as necessary, a local map to be used for estimation of the own position (hereinafter referred to as a self-position estimation map). The self-position estimation map is, for example, a high-accuracy map using a technology such as SLAM (Simultaneous Localization and Mapping). The self-position estimation section 132 supplies data indicating results of the estimation process to the map analysis section 151, the traffic rule recognition section 152, and the condition recognition section 153 of the condition analysis section 133, and so on. Also, the self-position estimation section 132 stores the self-position estimation map in the storage section 111.

The condition analysis section 133 performs an analysis process of analyzing conditions of the own vehicle and surrounding conditions of the vehicle. The condition analysis section 133 includes the map analysis section 151, the traffic rule recognition section 152, the condition recognition section 153, and a condition prediction section 154.

The map analysis section 151 performs a process of analyzing various types of maps stored in the storage section 111 by using, as necessary, data or signals from each section of the vehicle control system 100 such as the self-position estimation section 132 and the outside-vehicle information detection section 141, thus building a map including information required for processing of automatic driving. The map analysis section 151 supplies the built map not only to the traffic rule recognition section 152, the condition recognition section 153, and the condition prediction section 154 but also to a route planning section 161, a behavior planning section 162, an operation planning section 163 of the planning section 134, and so on.

The traffic rule recognition section 152 performs a recognition process of recognizing traffic rules around the own vehicle on the basis of data or signals supplied from each section of the vehicle control system 100 such as the self-position estimation section 132, the outside-vehicle information detection section 141, and the map analysis section 151. This recognition process allows, for example, for recognition of positions and states of the traffic signals around the own vehicle, details of traffic restrictions around the own vehicle, lanes on which vehicles are permitted to travel, and other information. The traffic rule recognition section 152 supplies data indicating results of the recognition process to the condition prediction section 154 and so on.

The condition recognition section 153 performs a recognition process of recognizing conditions regarding the own vehicle on the basis of data or signals supplied from each section of the vehicle control system 100 such as the self-position estimation section 132, the outside-vehicle information detection section 141, the in-vehicle information detection section 142, the vehicle state detection section 143, and the map analysis section 151. For example, the condition recognition section 153 performs a recognition process of recognizing conditions of the own vehicle, surrounding conditions of the own vehicle, conditions of the driver of the own vehicle, and so on. Also, the condition recognition section 153 generates, as necessary, a local map to be used for recognition of surrounding conditions of the own vehicle (hereinafter referred to as a condition recognition map). The condition recognition map is, for example, an occupancy grid map.

The conditions of the own vehicle to be recognized include, for example, not only a position, posture, and motion (e.g., speed, acceleration, traveling direction) but also presence or absence and details of a faulty condition and so on. The surrounding conditions of the own vehicle to be recognized include, for example, not only types and positions of surrounding stationary objects, types, positions, and motions (e.g., speed, acceleration, traveling direction) of surrounding moving objects, and configurations of surrounding roads and states of road surfaces but also weather, temperature, humidity, and brightness of surrounding regions, and so on. The driver's states to be recognized include, for example, not only a driver's physical condition, an awakening level, a concentration level, a fatigue level, and movement of a line of sight but also a driving maneuver and so on.

The condition recognition section 153 supplies data indicating results of the recognition process (including, as necessary, a condition recognition map) to the self-position estimation section 132, the condition prediction section 154, and so on. Also, the condition recognition section 153 stores the condition recognition map in the storage section 111.

The condition prediction section 154 performs a prediction process of predicting conditions regarding the own vehicle on the basis of data or signals supplied from each section of the vehicle control system 100 such as the map analysis section 151, the traffic rule recognition section 152, and the condition recognition section 153. For example, the condition prediction section 154 performs a prediction process of predicting conditions of the own vehicle, surrounding conditions of the own vehicle, the driver's condition, and so on.

The conditions of the own vehicle to be predicted include, for example, behavior of the own vehicle, occurrence of faulty condition, distance that can be travelled, and so on. The surrounding conditions of the own vehicle to be predicted include, for example, behavior of surrounding moving objects of the own vehicle, state changes of traffic lights, environmental changes such as weather change, and so on. The driver's conditions to be predicted include, for example, driver's behavior, a physical condition, and so on.

The condition prediction section 154 supplies data indicating results of the prediction process to the route planning section 161, the behavior planning section 162, the operation planning section 163 and so on together with data supplied from the traffic rule recognition section 152 and the condition recognition section 153.

The route planning section 161 plans a route to a destination on the basis of data or signals supplied from each section of the vehicle control system 100 such as the map analysis section 151 and the condition prediction section 154. For example, the route planning section 161 sets a route from the current position to a specified destination on the basis of a global map. Also, for example, the route planning section 161 changes the route as appropriate on the basis of not only conditions such as traffic jams, accidents, traffic restrictions, and road work but also the driver's physical condition and so on. The route planning section 161 supplies data indicating the planned route to the behavior planning section 162 and so on.

The behavior planning section 162 plans a behavior of the own vehicle for traveling safely on the route planned by the route planning section 161 within a planned time period on the basis of data or signals supplied from each section of the vehicle control system 100 such as the map analysis section 151 and the condition prediction section 154. For example, the behavior planning section 162 plans starting, stopping, traveling directions (e.g., moving forward, moving backward, turning left, turning right, and changing a direction), traveling lanes, traveling speeds, overtaking, and so on. The behavior planning section 162 supplies data indicating the planned behavior of the own vehicle to the operation planning section 163 and so on.

The operation planning section 163 plans operation of the own vehicle to realize the behavior planned by the behavior planning section 162 on the basis of data or signals supplied from each section of the vehicle control system 100 such as the map analysis section 151 and the condition prediction section 154. For example, the operation planning section 163 plans acceleration, deceleration, traveling tracks, and so on. The operation planning section 163 supplies data indicating the planned operation of the own vehicle to an acceleration/deceleration control section 172 and a direction control section 173 of the operation control section 135 and other sections.

The operation control section 135 controls the operation of the own vehicle. The operation control section 135 includes the emergency avoidance section 171, the acceleration/deceleration control section 172, and the direction control section 173.

The emergency avoidance section 171 performs a detection process of detecting emergencies such as collision, contact, entry into a hazardous region, an abnormal condition of the driver, and a faulty condition of the vehicle on the basis of detection results of the outside-vehicle information detection section 141, the in-vehicle information detection section 142, and the vehicle state detection section 143. The emergency avoidance section 171 plans, in the case where an emergency is detected, operation of the own vehicle to avoid the emergency such as sudden stop or sudden turn. The emergency avoidance section 171 supplies data indicating the planned operation of the own vehicle to the acceleration/deceleration control section 172, the direction control section 173, and so on.

The acceleration/deceleration control section 172 performs acceleration/deceleration control to realize the operation of the own vehicle planned by the operation planning section 163 or the emergency avoidance section 171. For example, the acceleration/deceleration control section 172 calculates a control target value of the driving force generation apparatus or the braking apparatus to realize the planned acceleration, deceleration, or sudden stop and supplies a control instruction indicating the calculated control target value to the driving unit control section 107.

The direction control section 173 performs direction control to realize the operation of the own vehicle planned by the operation planning section 163 or the emergency avoidance section 171. For example, the direction control section 173 calculates a control target value of the steering mechanism to realize the traveling track or sudden turn planned by the operation planning section 163 or the emergency avoidance section 171 and supplies a control instruction indicating the calculated control target value to the driving unit control section 107.

Configuration Example of the Data Acquisition Section

A description will be given next of a configuration example of the data acquisition section 102 including a detailed configuration of the sensor section 31 described above with reference to FIG. 7. It should be noted that, in describing the configuration of the data acquisition section 102, components having the same functions as those of the sensor section 31 described with reference to FIG. 3 will be denoted by the same reference numerals and that the description thereof will be omitted as appropriate.

The stereo camera 51 includes the cameras 51L and 51R that capture two images, left and right images, respectively, having predetermined parallax. The camera 51L of the stereo camera 51 captures a left-side image and includes an imaging element 201L, an image signal processing section 202L, and a time-of-day information addition section 203L. Also, the camera 51R captures a right-side image and includes an imaging element 201R, an image signal processing section 202R, and a time-of-day information addition section 203R.

It should be noted that in the case where there is no need to distinguish between the left and right components of each pair, namely, the imaging elements 201L and 201R, the image signal processing sections 202L and 202R, and the time-of-day information addition sections 203L and 203R, these components will be simply referred to as the imaging elements 201, the image signal processing sections 202, and the time-of-day information addition sections 203 and that the other components will be referred to in a similar manner.

The imaging elements 201 are image sensors that include a CMOS (Complementary Metal Oxide Semiconductor), a CCD (Charge Coupled Device), or other type of sensor, capturing images of a forward monitoring region and outputting the captured images to the image signal processing sections 202 as image signals. It should be noted that the imaging elements 201L and 201R are configured in such a manner as to produce predetermined parallax, thus allowing for distance measurement on a pixel-by-pixel basis in accordance with the parallax.

The image signal processing sections 202 perform predetermined processes on the image signal supplied from the imaging element 201 such as a demosaicing process, a white balancing process, and gamma correction, outputting resultant signals to the time-of-day information addition sections 203 as respective left and right stereo camera images.

The time-of-day information addition sections 203 add, to respective stereo camera images, time-of-day information including a reference time of day supplied from the reference time of day generation section 54 as time stamps, outputting the images to the signal output section 53.

The millimeter wave radar 52 includes a millimeter wave antenna 211, a radar reception signal processing section 212, and a time-of-day information addition section 213.

The millimeter wave antenna 211 generates and emits radio waves in the millimeter band to a region corresponding to the monitoring region of the stereo camera 51, receiving reflected waves of the emitted radio waves in the millimeter band reflected by a vehicle, a pedestrian, or the other obstacles, converting the reflected waves into a reception signal, and outputting the signal to the radar reception signal processing section 212.

The radar reception signal processing section 212 performs amplification, noise removal, and other processes and further signal processing such as distance measurement based on the round-trip time on the reception signal supplied from the millimeter wave antenna 211, outputting the resultant signal to the time-of-day information addition section 213.

The time-of-day information addition section 213 adds, to each radar image, time-of-day information including the reference time of day supplied from the reference time of day generation section 54 as a time stamp, outputting the image to the signal output section 53.

Configuration Example of the Outside-Vehicle Information Detection Section

A description will be given next of a configuration example of the outside-vehicle information detection section 141 with reference to FIG. 8.

The outside-vehicle information detection section 141 includes a calibration process section 231 and a detected object distance image generation section 232.

The calibration process section 231 finds an amount of time-of-day discrepancy on the basis of a stereo camera image including time-of-day information and a radar image including time-of-day information supplied chronologically from the sensor section 31 during a calibration process and stores the amount of time-of-day discrepancy. Also, the calibration process section 231 supplies, during a detected object distance image generation process, information regarding the amount of time-of-day discrepancy found during the calibration process to the detected object distance image generation section 232.

Going into more detail, the calibration process section 231 includes an object detection process section 251, a storage section 252, a time-of-day discrepancy detection section 253, and a time-of-day discrepancy storage section 254.

The object detection process section 251 finds object detection positions of the target 12, one based on the stereo camera image and another based on the radar image chronologically supplied from the sensor section 31, storing the object detection positions in the storage section 252 in association with time-of-day information. It should be noted that the detailed configuration and operation of the object detection process section 251 will be described later with reference to FIGS. 9 and 10.

The time-of-day discrepancy detection section 253 detects an amount of time-of-day discrepancy by using the time-of-day information of the stereo camera image and the time-of-day information of the radar image whose distances to the target 12 match, storing the amount of time-of-day discrepancy in the time-of-day discrepancy storage section 254. It should be noted that how the amount of time-of-day discrepancy is detected will be described in detail later with reference to FIG. 11.

The detected object distance image generation section 232 corrects the time-of-day discrepancy between the stereo camera image including time-of-day information and the radar image including time-of-day information supplied chronologically from the sensor section 31 by using the amount of time-of-day discrepancy found during the calibration process, properly synchronizing the two images and generating a detected object distance image.

Going into more detail, the detected object distance image generation section 232 includes a delay buffer 271, a time-of-day discrepancy correction process section 272, and an image processing section 273.

The delay buffer 271 buffers either the stereo camera image including time-of-day information or the radar image including time-of-day information, whichever is supplied by the amount of time-of-day discrepancy earlier. It should be noted that FIG. 8 assumes that the radar image is supplied first and that the delay buffer 271 buffers the radar image. However, in the case where the stereo camera image is supplied first, the delay buffer 271 buffers the stereo camera image. Also, there can be a case where it is not determined which is supplied first of the stereo camera image and the radar image. In such a case, the delay buffer 271 can buffer both images, and either the stereo camera image or the radar image, whichever is supplied first, may be buffered.

The time-of-day discrepancy correction process section 272 reads the amount of time-of-day discrepancy from the time-of-day discrepancy storage section 254 and reads the corresponding image buffered in the delay buffer 271 when the image to be supplied by the amount of time-of-day discrepancy later is supplied, and supplies the amount of time-of-day discrepancy and the image together to the image processing section 273. In the example illustrated in FIG. 8, the stereo camera image is supplied later. Therefore, by reading the radar image buffered by the delay buffer 271 by the duration corresponding to the amount of time-of-day discrepancy, the time-of-day discrepancy correction process section 272 supplies, to the image processing section 273, the stereo camera image and the radar image whose time-of-day discrepancy has been corrected, i.e., the stereo camera image and the radar image that are in synchronism without any time-of-day discrepancy.

The image processing section 273 generates, for example, a detected object distance image as illustrated at the bottom right in FIG. 1 and outputs the image to the condition recognition section 153 by using the stereo camera image and the radar image whose time-of-day information matches (is in synchronism).

Configuration Example of the Object Detection Process Section

A description will be given next of a configuration example of the object detection process section 251 with reference to FIG. 9.

The object detection process section 251 includes a distance image calculation section 291, a distance image target detection section 292, a stereo camera image target detection section 293, and a radar image target detection section 294.

The distance image calculation section 291 finds, on a pixel-by-pixel basis, a distance from two images having parallax and included in a stereo camera image and generates a distance image having the found distance as a pixel value. That is, for example, in the case where there are two images PL and PR having parallax and included in a stereo camera image as illustrated at the top in FIG. 10, the distance image calculation section 291 calculates a distance on a pixel-by-pixel basis in accordance with the parallax and generates a distance image P having the calculated distance as a pixel value.

The stereo camera image target detection section 293 detects, from the stereo camera image, the position where the target 12 appears in the image, i.e., the coordinate position of the target 12, outputting the position to the distance image target detection section 292 and the radar image target detection section 294.

Going into more detail, the marker 72 recognizable on the image is affixed to (or printed on or attached by other means to) the target 12 in the stereo camera image. Therefore, the stereo camera image target detection section 293 recognizes the coordinate position (x,y) of the target 12 by recognizing the marker 72 in the stereo camera image. The marker 72 may be, for example, a QR (Quick Response) code.

Figure 10:
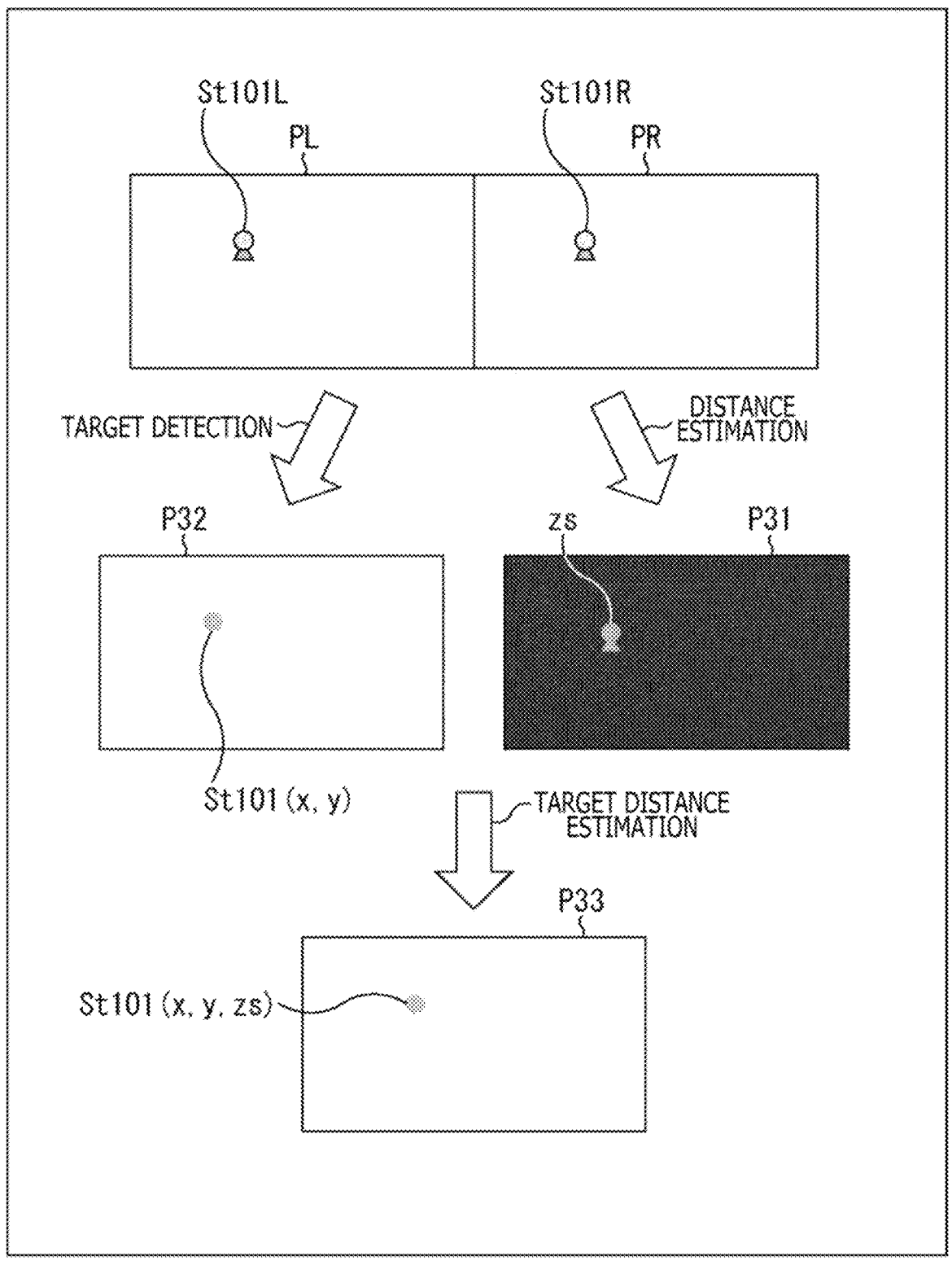
FIG. 10 is a diagram describing operation of the object detection process section illustrated in FIG. 8.

That is, as illustrated at the top in FIG. 10, the stereo camera image target detection section 293 finds, in a stereo camera image P32 found by the two images PL and PR having parallax and included in the stereo camera image, the coordinate position (x,y) of a profile St101 of the target 12.

It should be noted that in the case where the target 12 is the only target captured in the stereo camera image, the stereo camera image target detection section 293 is not an essential component because the profile appearing in the stereo camera image is obviously the target 12.

The distance image target detection section 292 estimates the distance to the target 12 from the pixel value (=distance) of the coordinate position (x,y) of the target 12 in the distance image supplied from the distance image calculation section 291, outputting the distance as a distance zs of the target 12 and outputting the distance to the radar image target detection section 294.

That is, a distance image P31 in the middle in FIG. 10 is an image having the actual distance of the position in the image as a pixel value. Therefore, the distance image target detection section 292 can find the distance zs of the target 12 as illustrated in a distance image P33 at the bottom in FIG. 10 by identifying a pixel value (x,y,zs) of the distance image P31 at the coordinate position (x,y) of the profile St101 of the target 12.

Because a response position of the target 12 is its distance itself, the radar image target detection section 294 considers, as depicted by the radar image P12 illustrated at the top right in FIG. 5, the position with a high radar response intensity near the position identified on the basis of an x position of the target 12 and the found distance zs of the target from the distance image target detection section 292 as a detection position of the target 12 and outputs the distance thereof as the distance zs of the target 12.

It should be noted that in the case where there is guarantee that the target 12 is the only target captured, the z position of a reflection position may be output in an 'as-is' manner as a distance zr.

Details of how the Amount of Time-of-Day Discrepancy is Detected

A description will be given next of details of how the amount of time-of-day discrepancy is detected with reference to FIG. 11.

The distance zr of the target 12 based on the radar image and the distance zs of the target 12 based on the stereo camera image found by the object detection process section 251 are stored in the storage section 252 respectively in association with pieces of time-of-day information.

The minimum numbers of the distances zr based on the radar image and the distances zs based on the stereo camera image stored in the storage section 252 are equal to the number of images captured over the time period corresponding to the anticipated maximum amount of time-of-day discrepancy. For example, when the time period corresponding to the maximum amount of time-of-day discrepancy is denoted as tm and stereo camera images and radar images are captured (acquired) at the same frame rate f (fps), the minimum numbers of the distances zr and the distances zs are tm×f. It should be noted that the distance zr based on the radar image and the distance zs based on the stereo camera image will be hereinafter simply referred to as the distance zr and the distance zs, respectively.

The time-of-day discrepancy detection section 253 reads either the distance zr corresponding to time-of-day information or the distance zs corresponding to time-of-day information and uses the read distance as a reference distance.

Next, the time-of-day discrepancy detection section 253 searches, of the set of distances zr or distances zs different from the set from which the reference distance has been acquired, for the distance zr or the distance zs which is equal to the reference distance or whose difference from the reference distance is minimal, and stores the difference in time-of-day information therebetween in the time-of-day discrepancy storage section 254 as an amount of time-of-day discrepancy.

Figure 11:
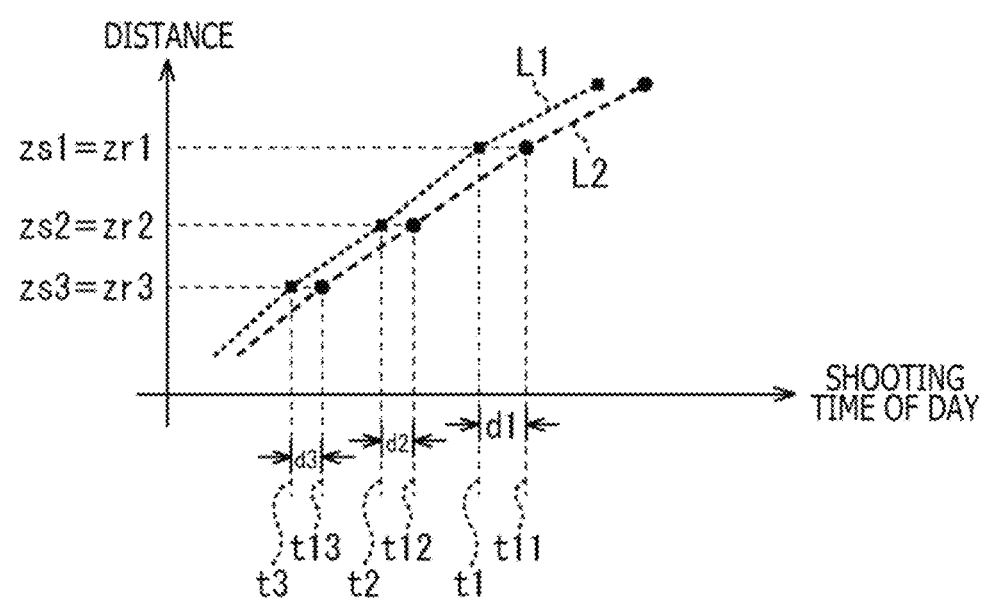
FIG. 11 is a diagram describing how an amount of time-of-day discrepancy is found.

That is, as illustrated in FIG. 11, the relationship between the time-of-day information when the distance to the target 12 is found from the radar image and the distance zr is depicted as a waveform L1, and the relationship between the time-of-day information when the distance of the target 12 is found from the stereo camera image and the distance zs is depicted as a waveform L2.

The target 12 is captured while the distance to the vehicle 11 continuously changes. Therefore, the distance of the target 12 detected together with time-of-day information should change. In the case where there is no time-of-day discrepancy, the distances of the target 12 detected from the images captured at the same time of day match. However, when there is a difference as illustrated in FIG. 11, this difference is an amount of time-of-day discrepancy.

The time-of-day discrepancy detection section 253 expresses the relationship between each set of a piece of time-of-day information and a distance as an approximation formula and finds the amount of time-of-day discrepancy from the difference between the approximation formulas. That is, in the case of FIG. 11, times of day t1, t2, and t3 and t11, t12, and t13 are found, respectively, at distances zs1 (=zr1), zs2 (=zr2), and zs3 (=zr3). Therefore, the time-of-day discrepancy detection section 253 generates an approximation formula for each of the waveforms L1 and L2 from the relationship between the distance and the time-of-day information and finds an amount of time-of-day discrepancy responsive to the distance.

Also, the time-of-day discrepancy detection section 253 may find the amount of time-of-day discrepancy in other way. For example, the time-of-day discrepancy detection section 253 may find amounts of time-of-day discrepancy at a plurality of locations and find an amount of time-of-day discrepancy by using a statistical amount such as an average or a median of these amounts. That is, as illustrated in FIG. 11, the time-of-day discrepancy detection section 253 may find an amount of time-of-day discrepancy by using a statistical amount such as an average or a median of differential times d1, d2, d3, and so on at the distances zs1 (=zr1), zs2 (=zr2), and zs3 (=zr3), respectively.

Figure 8:
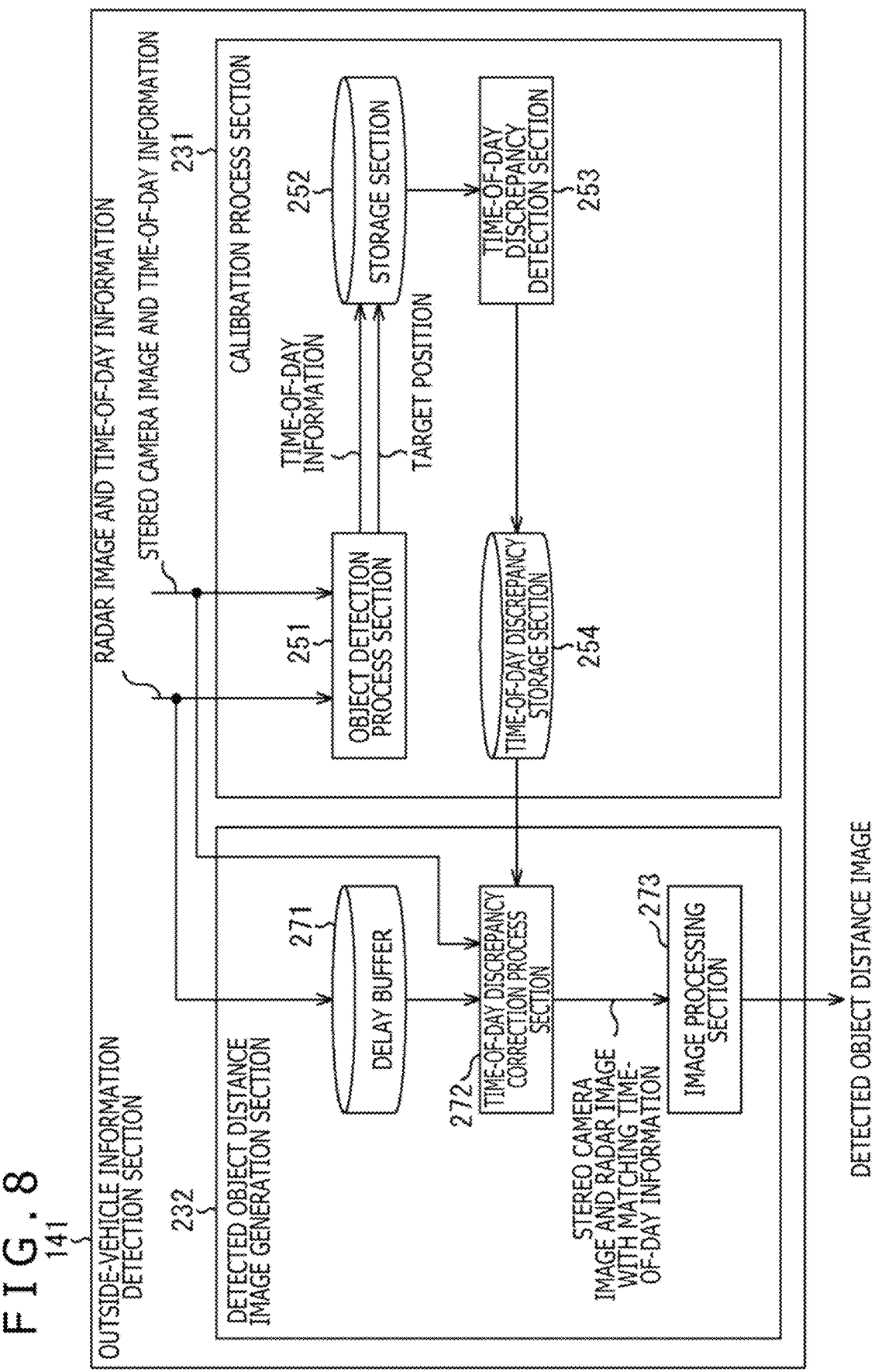
FIG. 8 is a block diagram describing a configuration example of an outside-vehicle information detection section illustrated in FIG. 6.

Calibration Process by the Outside-Vehicle Information Detection Section in FIG. 8

Figure 12:
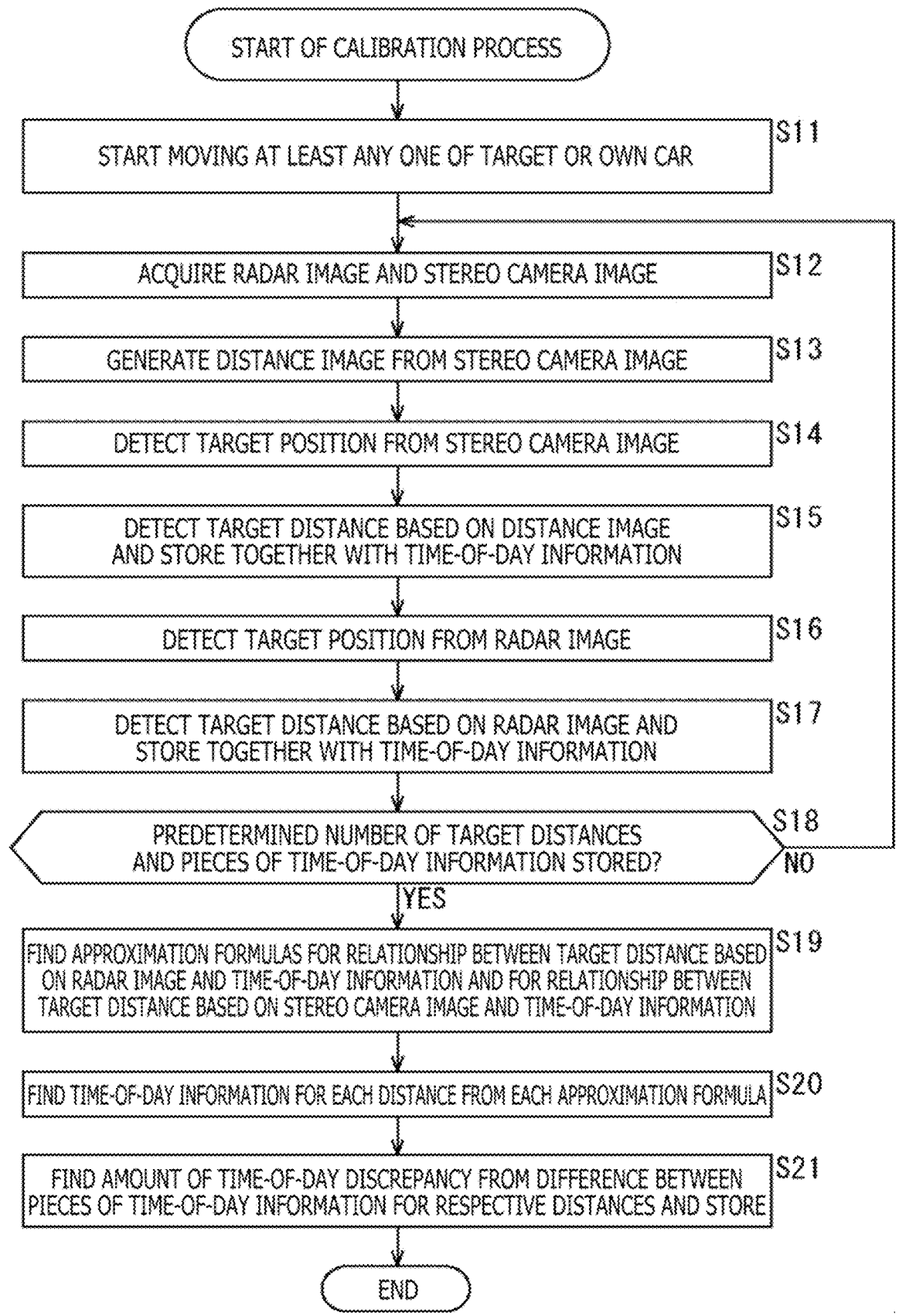
FIG. 12 is a flowchart describing a calibration process.

A description will be given next of the calibration process performed by the outside-vehicle information detection section 141 illustrated in FIG. 8 with reference to the flowchart illustrated in FIG. 12.

In step S11, at least any one of the target 12 or the vehicle 11 starts to move. That is, for example, as illustrated in FIG. 2, either of the target 12 or the vehicle 11 starts to move in such a manner that a distance D at which the target 12 and the vehicle 11 face each other changes.

In step S12, the stereo camera 51 captures a stereo camera image, assigns a time stamp, time-of-day information at which the image is captured, to the image, and outputs the image to the object detection process section 251 of the outside-vehicle information detection section 141. At the same time, the millimeter wave radar 52 generates a radar image, assigns a time stamp, time-of-day information at which the image is captured, to the image, and outputs the image to the outside-vehicle information detection section 141.

In step S13, the distance image calculation section 291 of the object detection process section 251 finds a distance on a pixel-by-pixel basis on the basis of the stereo camera image including two images having predetermined parallax, generates a distance image having the found distance as a pixel value of each pixel, and outputs the distance image to the distance image target detection section 292 together with a time stamp, time-of-day information when the stereo camera image is captured.

In step S14, the stereo camera image target detection section 293 identifies, on the basis of the stereo camera image, the coordinate position (x,y) of the marker 72 included in the target 12 in the image as a target position, outputting the coordinate position to the distance image target detection section 292 and the radar image target detection section 294. It should be noted that only the x coordinate may be supplied to the radar image target detection section 294.

In step S15, the distance image target detection section 292 supplies the pixel value of the distance image corresponding to the coordinate position (x,y) in the stereo camera image to the radar image target detection section 294 as the distance zs of the target 12 found from the stereo camera image and, at the same time, outputs the distance image together with time-of-day information, time stamp information, to the storage section 252 for storage.

In step S16, the radar image target detection section 294 detects the position with the highest radar response intensity near the corresponding position in the radar image as a target distance, the position of the target 12, on the basis of the x coordinate of the coordinate position (x,y) of the target 12 found from the stereo camera image and the distance zs supplied from the distance image target detection section 292.

In step S17, the radar image target detection section 294 outputs, to the storage section 252, the response value in the radar image identified as the position of the target 12 for storage therein as a target distance, the distance zr to the target 12 found from the radar image.

In step S18, the time-of-day discrepancy detection section 253 determines whether or not as many distances to the target 12 based on the stereo camera image and pieces of time-of-day information and as many distances to the target 12 based on the radar image and pieces of time-of-day information, respectively, as a predetermined number of times are stored in the storage section 252.

In step S18, in the case where as many distances zs to the target 12 based on the stereo camera image and pieces of time-of-day information and as many distances zr to the target 12 based on the radar image and pieces of time-of-day information, respectively, as a predetermined number of times are not stored, the process returns to step S12. That is, the processes from step S12 to step S18 are repeated until as many distances zs to the target 12 based on the stereo camera image and pieces of time-of-day information and as many distances zr to the target 12 based on the radar image and pieces of time-of-day information, respectively, as the predetermined number of times are stored.

Then, in the case where, as a result of repetition of the processes from step S12 to step S18 the predetermined number of times, as many distances zs to the target 12 based on the stereo camera image and pieces of time-of-day information and as many distances zr to the target 12 based on the radar image and pieces of time-of-day information as the predetermined number of times are considered as having been stored, the process proceeds to step S19.

In step S19, the time-of-day discrepancy detection section 253 reads the distance zs to the target 12 based on the stereo camera image and time-of-day information and the distance zr to the target 12 based on the radar image and time-of-day information stored in the storage section 252 and finds an approximation formula for the time of day of each of the distance zs and the distance zr.

That is, the time-of-day discrepancy detection section 253 finds an approximation formula for the time of day of each of the distance zs and the distance zr.

In step S20, the time-of-day discrepancy detection section 253 finds the time of day of each of the distance zs and the distance zr for a predetermined distance on the basis of the found approximation formula.

That is, the time-of-day discrepancy detection section 253 finds, for example, the time of day t1 at the distance zr1, the time of day t2 at the distance zr2, the time of day t3 at the distance zr3, the time of day t11 at the distance zs1, the time of day t12 at the distance zs2, and the time of day t13 at the distance zs3, found by the approximation formulas, as illustrated in FIG. 11.

In step S21, the time-of-day discrepancy detection section 253 finds an amount of time-of-day discrepancy from a difference in time of day, a difference between times of day for the distance zs and the distance zr, respectively, and stores the amount of time-of-day discrepancy in the time-of-day discrepancy storage section 254.

That is, the time-of-day discrepancy detection section 253 finds, as illustrated in FIG. 11, each of the differential time d1 (=time of day t11−time of day t1), the differential time d2 (=time of day t12−time of day t2), and the differential time d3 (=time of day t13−time of day t3), finds an average or a median as an amount of time-of-day discrepancy, and stores the amount of time-of-day discrepancy in the time-of-day discrepancy storage section 254.

The above processes make it possible to find the amount of time-of-day discrepancy in the acquisition of the stereo camera image and the radar image at the same distance between the stereo camera 51 and the millimeter wave radar 52. By using the found amount of time-of-day discrepancy, it is possible to generate a detected object distance image obtained by combining the detection results of the stereo camera 51 and the millimeter wave radar 52 that have been synchronized with high accuracy, thus ensuring improved accuracy of the detected object distance image.

Detected Object Distance Image Generation Process

Figure 13:
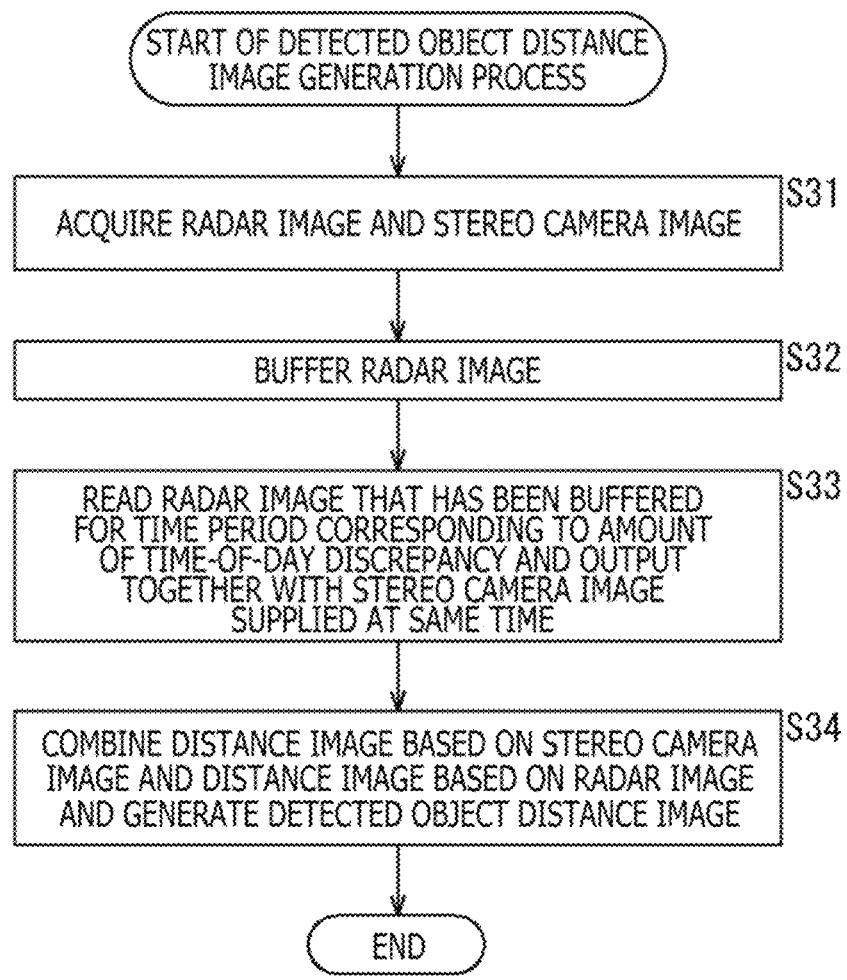
FIG. 13 is a flowchart describing a detected object distance image generation process.

A description will be given next of a detected object distance image generation process with reference to the flowchart illustrated in FIG. 13.

In step S31, the stereo camera 51 captures a stereo camera image, assigns a time stamp, time-of-day information at which the image is captured, to the image, and outputs the image to the object detection process section 251 of the outside-vehicle information detection section 141. At the same time, the millimeter wave radar 52 generates a radar image, assigns a time stamp, time-of-day information at which the radar image is generated, to the image, and outputs the image to the outside-vehicle information detection section 141.

It should be noted, however, that even if the processes are performed at the same time, a time-of-day discrepancy occurs in timing at which the stereo camera image and the radar image of the same object at the same distance are supplied as described above.

It should be noted that a description will be given here assuming that the radar image is supplied by the duration corresponding to the amount of time-of-day discrepancy earlier than the stereo camera image. However, the order in which the radar images and the stereo camera images are supplied respectively is as per the calibration, and the order may be reversed.

In step S32, the delay buffer 271 buffers the radar image.

In step S33, the time-of-day discrepancy correction process section 272 reads information regarding the amount of time-of-day discrepancy stored in the time-of-day discrepancy storage section 254 and supplies, to the image processing section 273, the radar image that has been buffered for the time period corresponding to the amount of time-of-day discrepancy together with the stereo image supplied at the same time.

In step S34, the image processing section 273 generates a detected object distance image by combining the supplied stereo camera image and radar image and outputs the detected object distance image, for example, to the condition recognition section 153.

That is, the stereo camera image is supplied by the duration corresponding to the amount of time-of-day discrepancy later than the radar image. Therefore, by reading, of the radar images buffered in the delay buffer 271, the radar image that has been buffered for the duration corresponding to the amount of time-of-day discrepancy from the current time of day in timing when a new stereo camera image is supplied, it is possible to adjust the stereo camera image and the radar image to the same timing when the target objects exist at the same distance.

As a result, it is possible to generate a detected object distance image by combining the stereo camera image and the radar image after synchronizing the two images with high accuracy. It should be noted that although an example has been described above in which a jig, a target, is detected using stereo camera images and radar images, the target need only be an object that can be detected simultaneously by sensors based on different schemes. Therefore, the target need not be an object like the jig of the present disclosure as long as the target can be detected simultaneously by sensors based on different schemes.

3. Application Example

Example of Using a Substitute for the Target

An example has been described above in which the amount of time-of-day discrepancy is detected by the calibration process. However, the calibration process is conducted only under a specific condition where the target 12 is provided, such as at the time of factory shipment. Therefore, there is a likelihood that if the amount of time-of-day discrepancy changes due, for example, to deterioration over time, the accuracy associated with synchronization between the stereo camera image and the radar image may diminish.

The target 12 can be detected both by the stereo camera 51 and the millimeter wave radar 52. At the time of traveling, however, the calibration process can be performed repeatedly during traveling by setting a substitute for the target 12.

Figure 14:
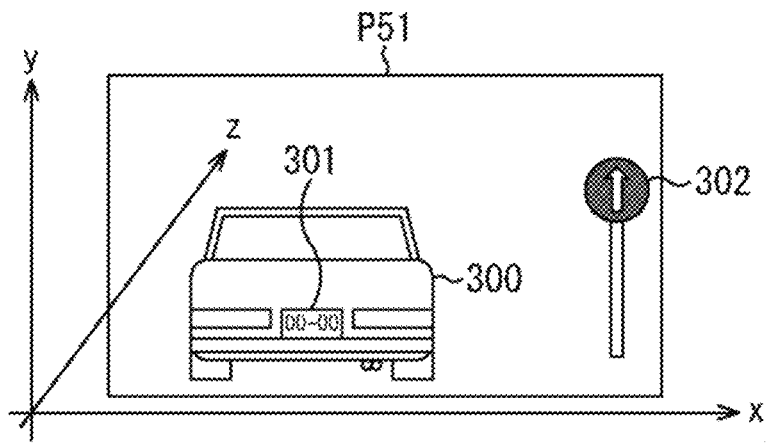
FIG. 14 is a diagram describing an example of a substitute for a target.

A possible substitute for the target 12 is, for example, a license plate 301 attached to the rear of a vehicle 300 or a road sign 302 as illustrated by an image P51 in FIG. 14.

The attachment positions, shapes, and other features of the license plate 301 attached to the rear of the vehicle 300 and the road sign 302 are fixed in advance, thus allowing for detection from both the stereo camera image and the radar image.

Therefore, the calibration process can be performed repeatedly during traveling by using the license plate 301 or the road sign 302 as a substitute for the target 12.

Figure 15:
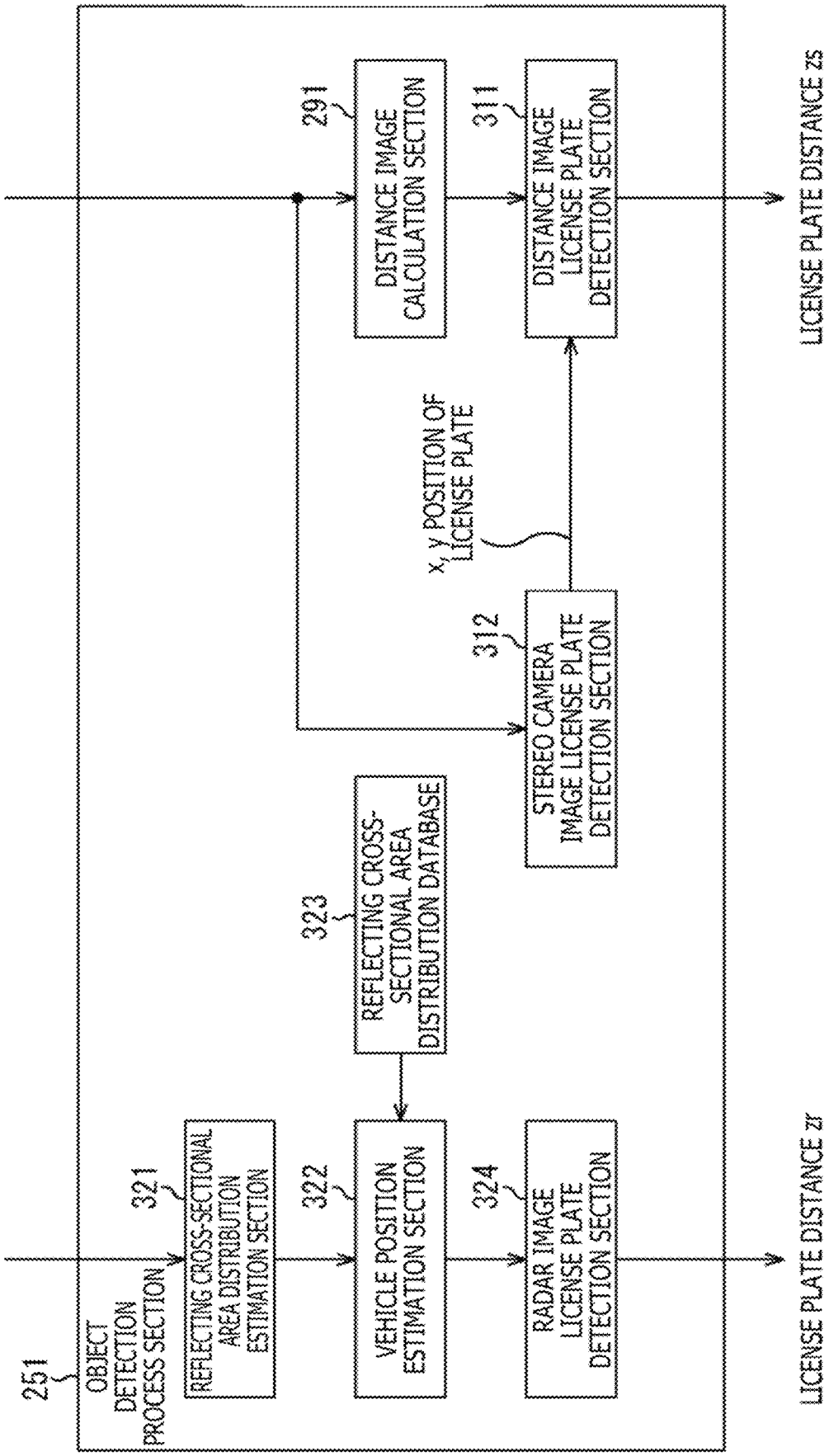
FIG. 15 is a block diagram describing a configuration example of the object detection process section of an application example of the present disclosure.

Configuration Example of the Object Detection Process Section in the Case where the License Plate is Used as a Substitute for the Target FIG. 15 illustrates a configuration example of the object detection process section 251 in the case where the license plate 301 is used as a substitute for the target 12. It should be noted that components having the same functions as those of the object detection process section 251 illustrated in FIG. 9 will be denoted by the same reference numerals and that the description thereof will be omitted as appropriate.

Figure 9:
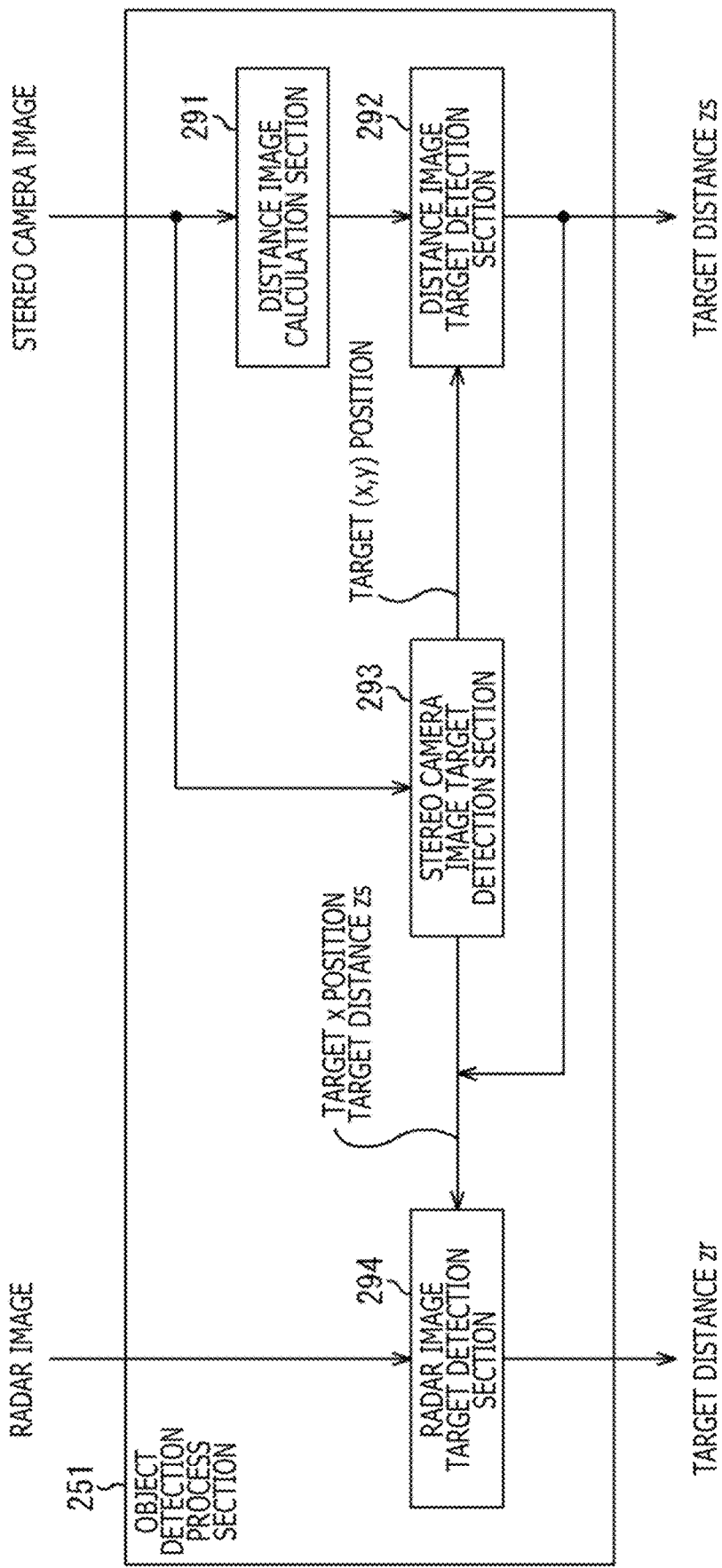
FIG. 9 is a block diagram describing a configuration example of an object detection process section illustrated in FIG. 8.

That is, the object detection process section 251 illustrated in FIG. 15 differs from the object detection process section 251 illustrated in FIG. 9 in that a distance image license plate detection section 311, a stereo camera image license plate detection section 312, and a radar image license plate detection section 324 are provided in place of the distance image target detection section 292, the stereo camera image target detection section 293, and the radar image target detection section 294. Also, a reflecting cross-sectional area distribution estimation section 321, a vehicle position estimation section 322, and a reflecting cross-sectional area distribution database 323 are provided as new components.

The stereo camera image license plate detection section 312 detects the license plate from the stereo camera image through image recognition, detecting the coordinate position (x,y) in the image and supplying the coordinate position to the distance image license plate detection section 311.

The distance image license plate detection section 311 identifies the distance of the coordinate position (x,y) of the license plate in the distance image supplied from the distance image calculation section 291 as a distance to the license plate, outputting the distance as the distance zs to the license plate based on the stereo camera image.

The reflecting cross-sectional area distribution estimation section 321 estimates a reflecting cross-sectional area distribution related to a response intensity in the radar image, supplying the estimated reflecting cross-sectional area distribution to the vehicle position estimation section 322.

The vehicle position estimation section 322 compares the reflecting cross-sectional area distribution supplied from the reflecting cross-sectional area distribution estimation section 321 against the reflecting cross-sectional area distribution for each vehicle type stored in the reflecting cross-sectional area distribution database 323, identifying the vehicle type and estimating the vehicle coordinate position in the radar image.

The radar image license plate detection section 324 outputs the vehicle position as the license plate distance zr based on the radar image on the basis of the coordinate position of the vehicle in the radar image.

Figure 16:
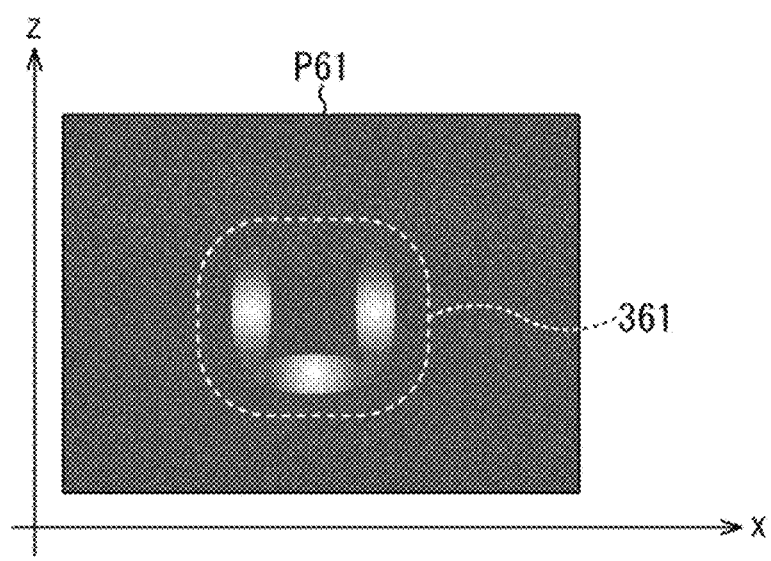
FIG. 16 is a diagram describing an example of a radar image in the case where a license plate is used as a substitute for the target.

That is, as illustrated by a reflecting cross-sectional area distribution 361 in a radar image P61 in FIG. 16, a reflecting cross-sectional area distribution produced by reflected waves of transmitted millimeter waves has characteristics responsive to the vehicle type. Therefore, comparison against the database storing the reflecting cross-sectional area distribution for each vehicle type in advance makes it possible to identify the vehicle type and the vehicle position on the basis of the comparison result. In FIG. 16, the reflecting cross-sectional area distribution in a rectangular shape with an opening portion facing up represents the characteristics and the position of the vehicle.

If the position of the vehicle 11 can be identified, the vehicle 11 can be caused to function in a similar manner to the target 12 because the vehicle 11 and the license plate can be considered approximately at the same distance.

Also, in the case where the millimeter wave radar 52 has a sufficiently high resolution, the vehicle shape can be found with more accuracy, thus realizing detection of the license plate distance.

Calibration Process Using the Object Detection Process Section Illustrated in FIG. 14

A description will be given next of the calibration process using the object detection process section 251 illustrated in FIG. 14 with reference to the flowchart illustrated in FIG. 17.

In step S51, the sensor section 31 determines whether or not a predetermined time period has elapsed. In the case where the predetermined time period has yet to elapse in step S51, the process proceeds to step S63, and the outside-vehicle information detection section 141 determines whether or not an instruction has been issued to terminate the calibration process. In the case where no instruction has been issued to terminate the calibration process, the process returns to step S51. That is, as long as no instruction is issued to terminate the calibration process, and until the predetermined time period elapses, the processes in steps S51 and S63 are repeated.

Figure 17:
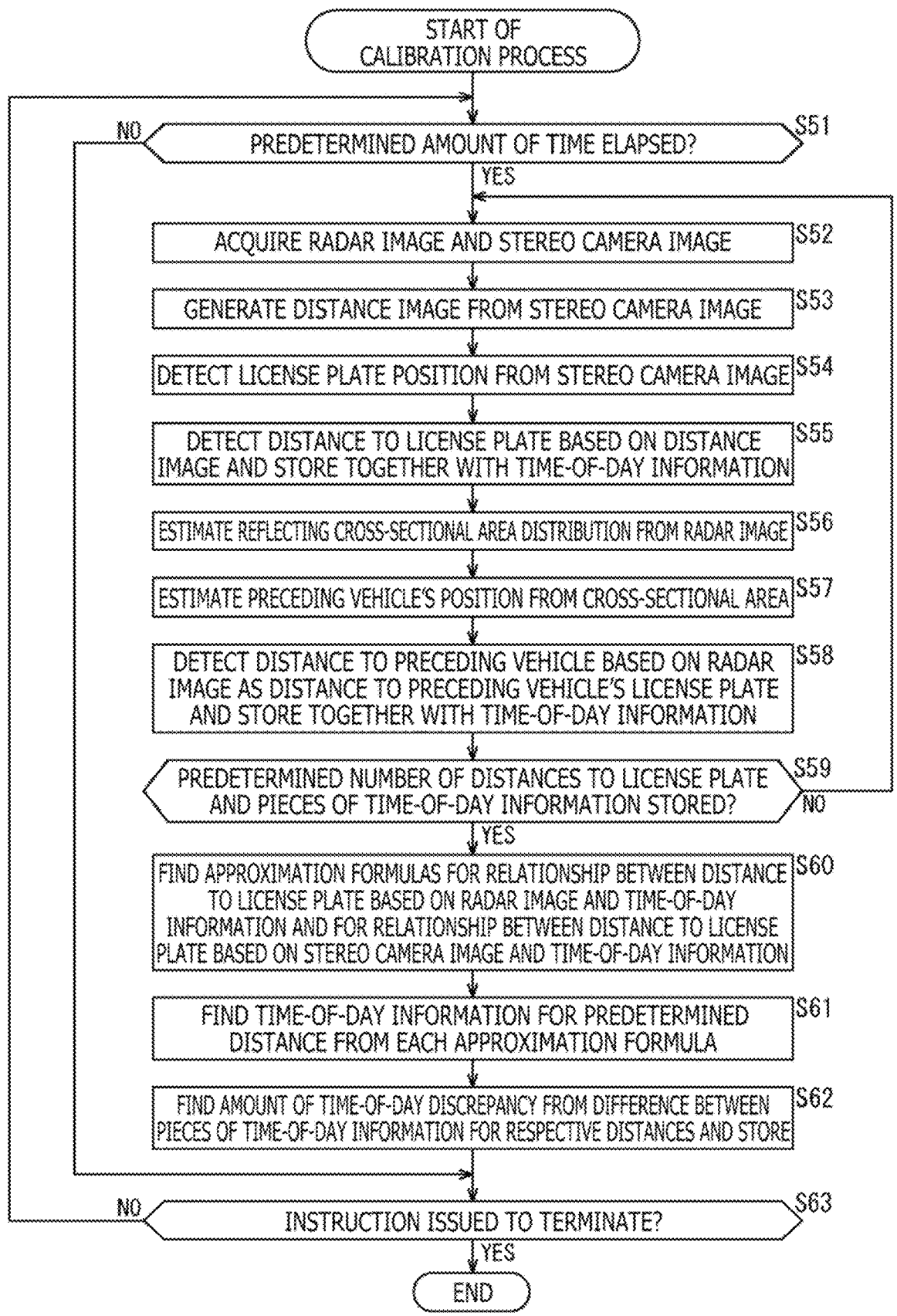
FIG. 17 is a flowchart describing the calibration process in the case where a license plate is used as the target.

It should be noted that the calibration process described with reference to the flowchart illustrated in FIG. 17 is a process repeated at predetermined time intervals during a normal traveling state. Therefore, the calibration process is performed in parallel with the detected object distance image generation process or while the detected object distance image generation process is halted at predetermined time intervals.

In step S51, in the case where the predetermined time period has elapsed, the process proceeds to step S52.

In step S52, the stereo camera 51 captures a stereo camera image, assigns a time stamp, time-of-day information at which the image is captured, to the image, and outputs the image to the object detection process section 251 of the outside-vehicle information detection section 141. At the same time, the millimeter wave radar 52 generates a radar image, assigns a time stamp, time-of-day information at which the image is generated, to the image, and outputs the image to the outside-vehicle information detection section 141.

In step S53, the distance image calculation section 291 of the object detection process section 251 finds a distance on a pixel-by-pixel basis on the basis of the stereo camera image including two images having predetermined parallax, generates a distance image having the found distance as a pixel value of each pixel, and outputs the distance image to the distance image license plate detection section 311 together with a time stamp, time-of-day information when the stereo camera image is captured.

In step S54, the stereo camera image license plate detection section 312 recognizes, on the basis of the stereo camera image, the license plate in the image and identifies the coordinate position (x,y) of the recognized license plate, outputting the coordinate position to the distance image license plate detection section 311.

In step S55, the distance image license plate detection section 311 outputs, to the storage section 252 for storage, the pixel value of the distance image corresponding to the coordinate position (x,y) in the stereo camera image, in which the license plate is detected, as the distance zs of the license plate found from the stereo camera image together with time stamp information.

In step S56, the reflecting cross-sectional area distribution estimation section 321 estimates a reflecting cross-sectional area distribution from the response in the radar image, outputting the estimated reflecting cross-sectional area distribution to the vehicle position estimation section 322.

In step S57, the vehicle position estimation section 322 identifies the vehicle coordinate position in the radar image on the basis of the reflecting cross-sectional area distribution estimated from the response in the radar image, outputting the identified coordinate position information to a radar image license plate detection section 313.

In step S58, the radar image license plate detection section 324 outputs, to the storage section 252 for storage, the vehicle position as the license plate distance zr based on the radar image on the basis of the coordinate position of the vehicle in the radar image together with time stamp information of the radar image.

In step S59, the time-of-day discrepancy detection section 253 determines whether or not as many distances zs to the license plate based on the stereo camera image and pieces of time-of-day information and as many distances zr to the license plate based on the radar image and pieces of time-of-day information, respectively, as a predetermined number of times are stored in the storage section 252.

In step S59, in the case where as many distances zs to the license plate based on the stereo camera image and pieces of time-of-day information and as many distances zr to the license plate based on the radar image and pieces of time-of-day information, respectively, as a predetermined number of times are not stored, the process returns to step S52. That is, the processes from step S52 to step S59 are repeated until as many distances zs to the license plate based on the stereo camera image and pieces of time-of-day information and as many distances zr to the license plate based on the radar image and pieces of time-of-day information, respectively, as the predetermined number of times are stored.

Then, in the case where, as a result of repetition of the processes from step S52 to step S59 the predetermined number of times, as many distances zs to the license plate based on the stereo camera image and pieces of time-of-day information and as many distances zr to the license plate based on the radar image and pieces of time-of-day information, respectively, as the predetermined number of times are considered as having been stored, the process proceeds to step S60.

In step S60, the time-of-day discrepancy detection section 253 reads not only the distance zs to the license plate based on the stereo camera image and time-of-day information but also the distance zr to the license plate based on the radar image and time-of-day information stored in the storage section 252 and finds an approximation formula for each of the times of day of the distance zs and the distance zr.

In step S61, the time-of-day discrepancy detection section 253 finds each of the times of day of the distance zs and the distance zr for the predetermined distance on the basis of the found approximation formula.

In step S62, the time-of-day discrepancy detection section 253 finds an amount of time-of-day discrepancy for each distance from the difference between the times of day of the distance zs and the distance zr, storing the amount of time-of-day discrepancy in the time-of-day discrepancy storage section 254.

The above processes make it possible to find the amount of time-of-day discrepancy in the acquisition of the stereo camera image and the radar image at the same distance between the stereo camera 51 and the millimeter wave radar 52 repeatedly at predetermined time intervals during traveling even if the license plate is used as a detection target in place of the target 12.

As a result, the amount of time-of-day discrepancy is updated and stored repeatedly at the predetermined time intervals, thus making it possible to respond to the change in the amount of time-of-day discrepancy caused, for example, by deterioration over time and ensure improved accuracy in the detected object distance image obtained by combining the detection results of the stereo camera 51 and the millimeter wave radar 52.

Also, although an example has been described above in which a vehicle's license plate is used as a substitute for the target 12, an object other than a license plate may be used as long as the shape and size of the object have been identified, and as long as the object can be recognized as a substitute for the target 12. For example, a road sign may be used. It should be noted that because the detected object distance image generation process is similar to the process described with reference to FIG. 13, the description thereof will be omitted.

4. Modification Example

Modification Example in which LIDAR is Provided in Place of the Millimeter Wave Radar Although an example has been described above in which a detected object distance image is generated by combining a stereo camera image captured with the stereo camera 51 and a radar image obtained by the millimeter wave radar 52, the plurality of sensors included in the sensor section 31 may be a combination other than that of the stereo camera 51 and the millimeter wave radar 52.

For example, a distance image using a laser beam referred to as LIDAR (Light Detection and Ranging, Laser Imaging Detection and Ranging) and a distance image including a pixel value of distance information corresponding to each coordinate position (x, y) of a stereo camera image may be used for combination with the stereo camera image. It should be noted that a distance image acquired by using a LIDAR will be hereinafter referred to as a LIDAR distance image.

Although lower in resolution than a distance image acquired by using a stereo camera image, a LIDAR distance image offers high distance accuracy.

Figure 18:
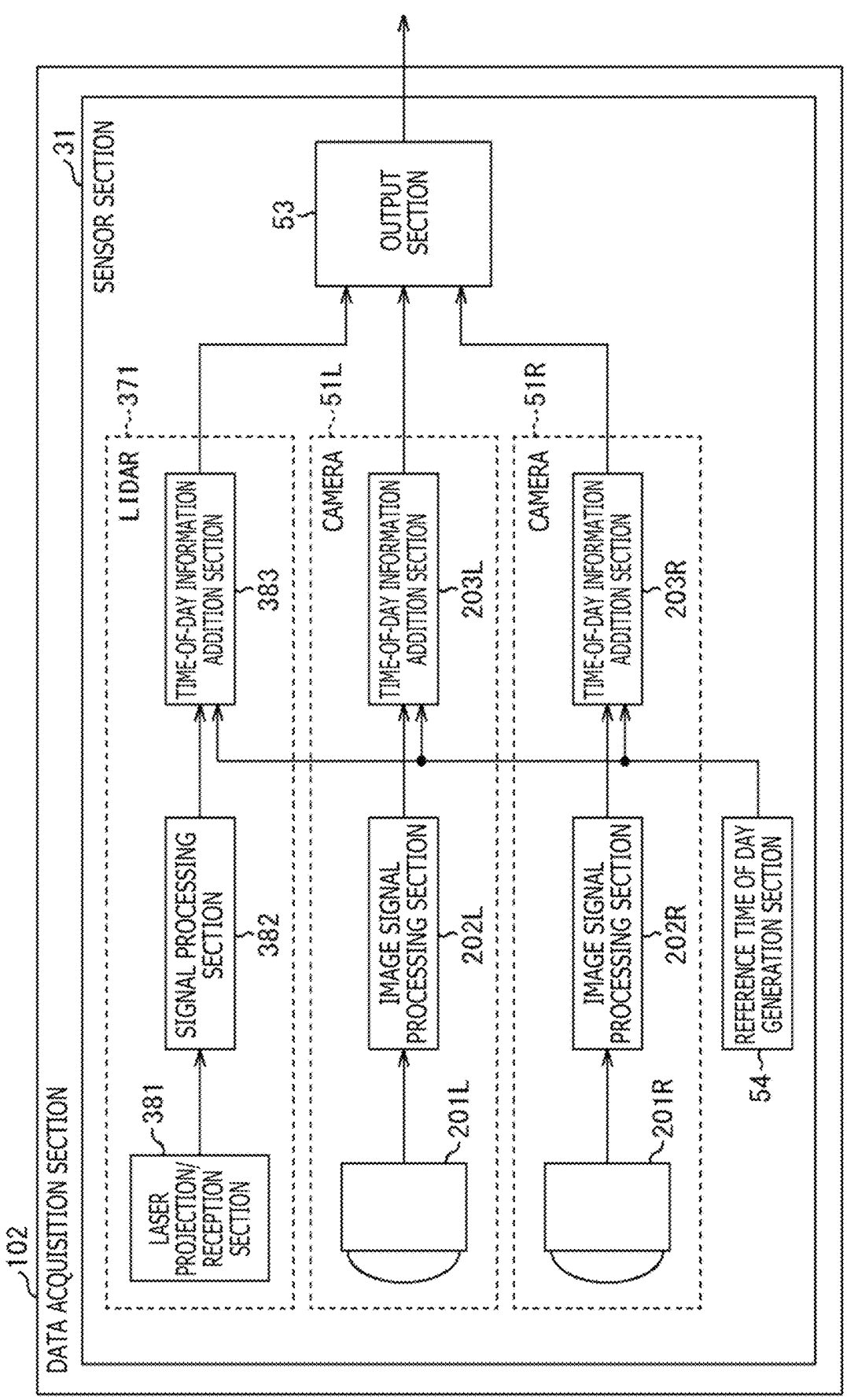
FIG. 18 is a block diagram describing a modification example of the sensor section using a LIDAR in place of a millimeter wave radar.

FIG. 18 illustrates a configuration example of the sensor section 31 having a LIDAR 371 in place of the millimeter wave radar 52. It should be noted that the components of the sensor section 31 illustrated in FIG. 18 having the same functions as those of the sensor section 31 illustrated in FIG. 7 will be denoted by the same reference numerals and that the description thereof will be omitted as appropriate.

Figure 7:
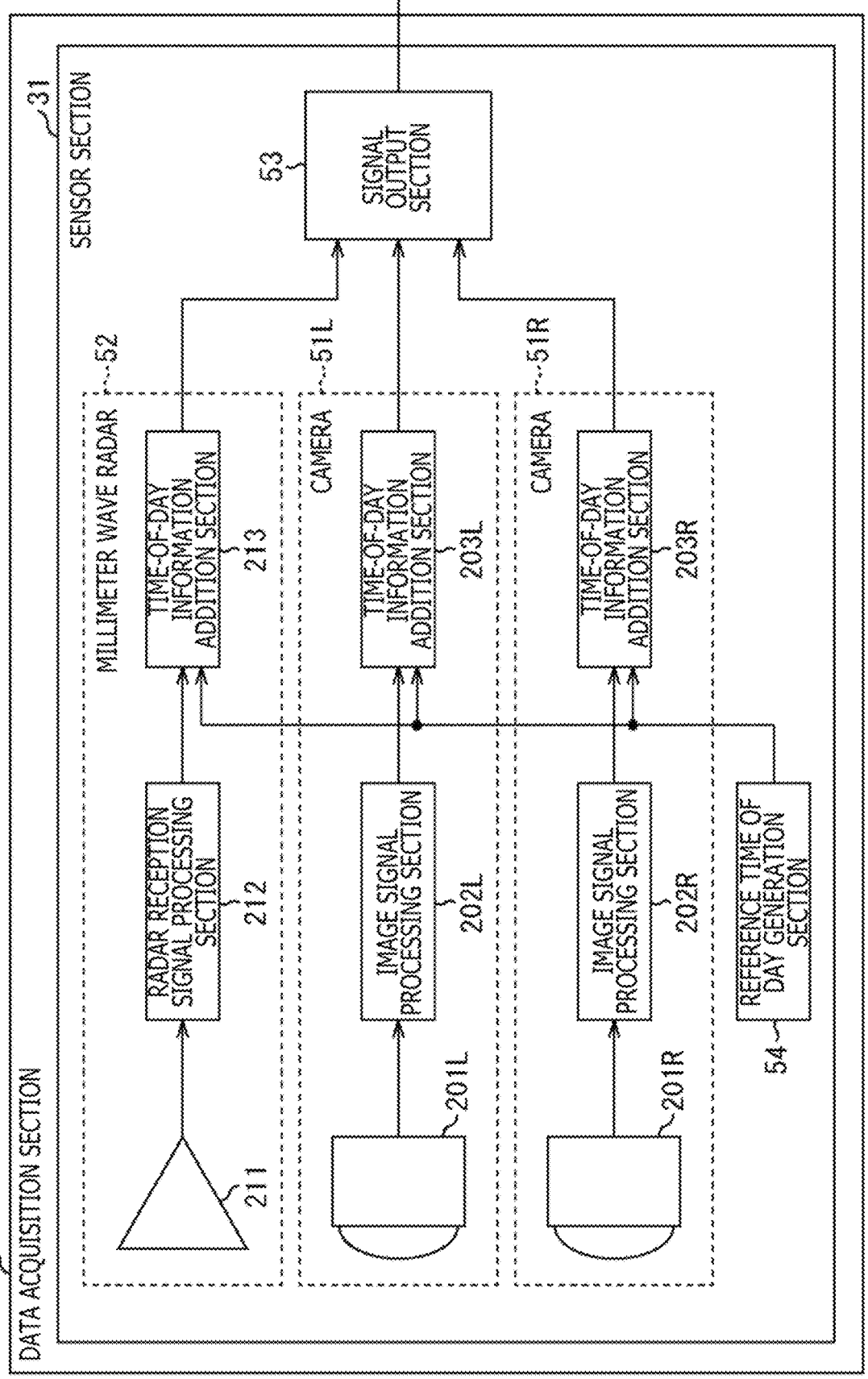
FIG. 7 is a block diagram describing a configuration example of a sensor section in a data acquisition section illustrated in FIG. 6.

That is, the sensor section 31 illustrated in FIG. 18 differs from the sensor section 31 illustrated in FIG. 7 in that the LIDAR 371 is provided in place of the millimeter wave radar 52.

The LIDAR 371 includes a laser projection/reception section 381, a signal processing section 382, and a time-of-day information addition section 383.

The laser projection/reception section 381 projects a laser beam with a predetermined resolution to the forward monitoring region in the traveling direction of the vehicle 11 and receives a reflected beam of the projected laser beam, supplying, to the signal processing section 382, a signal that includes a reception intensity of the reflected beam or a signal indicating the timing when the beam is projected and the timing when the reflected beam is received.

The signal processing section 382 generates a LIDAR reflection intensity image including a reception intensity of the reflected beam and finds the distance through the so-called ToF (Time of Flight) method on the basis of the round-trip time of the laser beam found from the timing when the projected laser beam is projected and the timing when the reflected beam is received, generating a LIDAR distance image and outputting a LIDAR reflection intensity image and a LIDAR distance image to the time-of-day information addition section 383 as a pair.

The time-of-day information addition section 383 adds reference time-of-day information, supplied from the reference time of day generation section 54, to each pair of a LIDAR reflection intensity image and a LIDAR distance image as a time stamp, outputting each pair to the signal output section 53. It should be noted that a pair of a LIDAR reflection intensity image and a LIDAR distance image will be hereinafter simply referred to as a LIDAR image.

Configuration Example of the Target in the Case where LIDAR is Used

A description will be given next of a configuration example of a target in the case where the sensor section 31 having the LIDAR 371 in place of the millimeter wave radar 52 is used.

Figure 19:
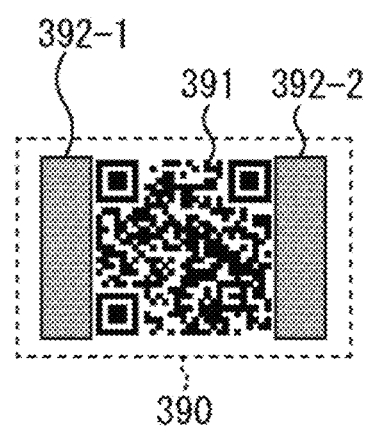
FIG. 19 is a diagram describing a configuration example of the target corresponding to the sensor section illustrated in FIG. 18.

As illustrated in FIG. 19, a target 390 used in the case where the sensor section 31 has the LIDAR 371 in place of the millimeter wave radar 52 has laser reflectors 392-1 and 392-2 whose laser reflection ratios are higher than a predetermined value and a marker 391 similar to the marker 72 at the center.

Configuration Example of the Object Detection Process Section in the Case where LIDAR is Used in the Sensor Section A description will be given next of a configuration example of the object detection process section 251 in the case where the LIDAR 371 is used in the sensor section 31 with reference to FIG. 20. It should be noted that the components of the object detection process section 251 illustrated in FIG. 20 having the same functions as those of the object detection process section 251 illustrated in FIG. 9 will be denoted by the same reference numerals and that the description thereof will be omitted as appropriate.

Figure 20:
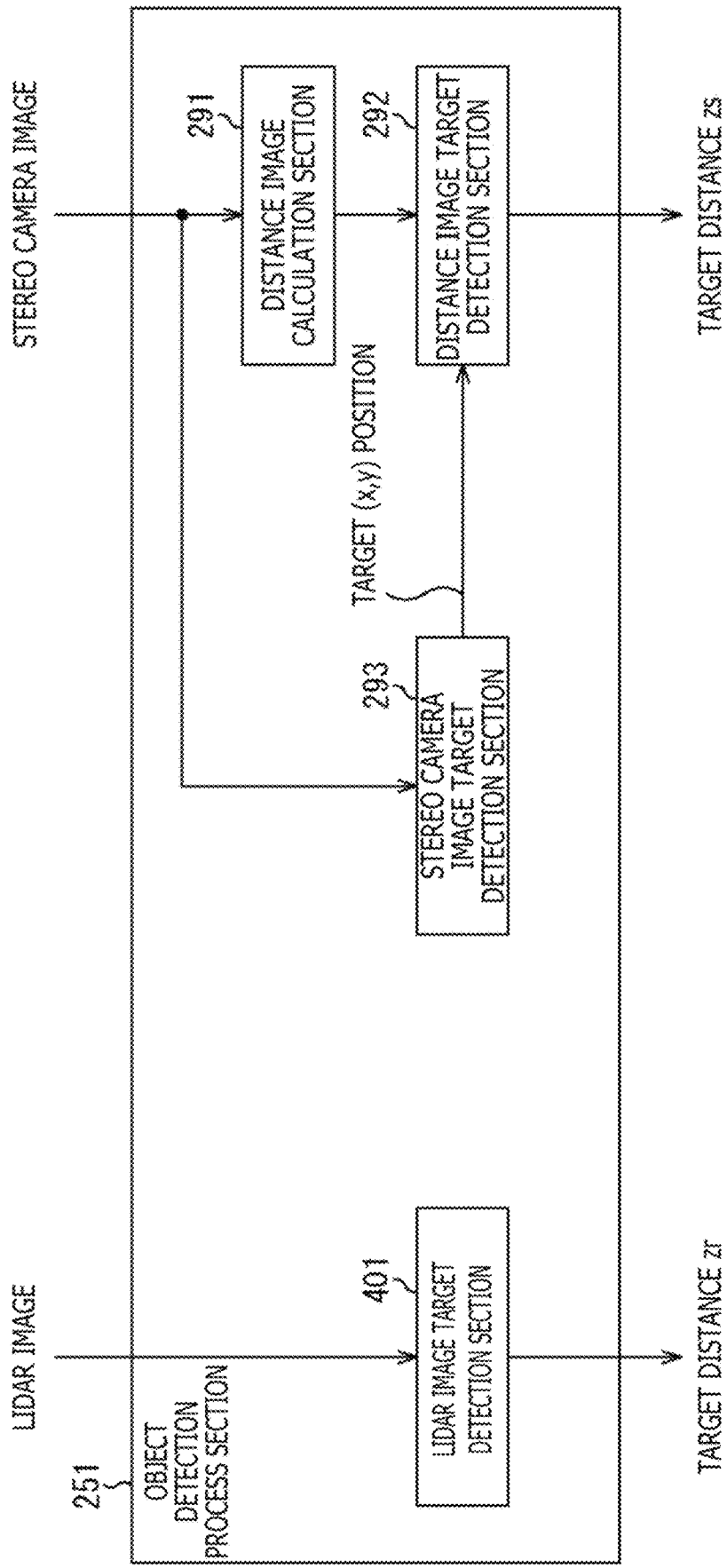
FIG. 20 is a block diagram describing a configuration example of the object detection process section corresponding to the sensor section illustrated in FIG. 18.

The object detection process section 251 illustrated in FIG. 20 differs from the object detection process section 251 illustrated in FIG. 9 in that a LIDAR image target detection section 401 is provided in place of the radar image target detection section 294.

The LIDAR image target detection section 401 finds the distance zr of the target 390 on the basis of the LIDAR reflection intensity image and the LIDAR distance image included in the LIDAR image.

Figure 21:
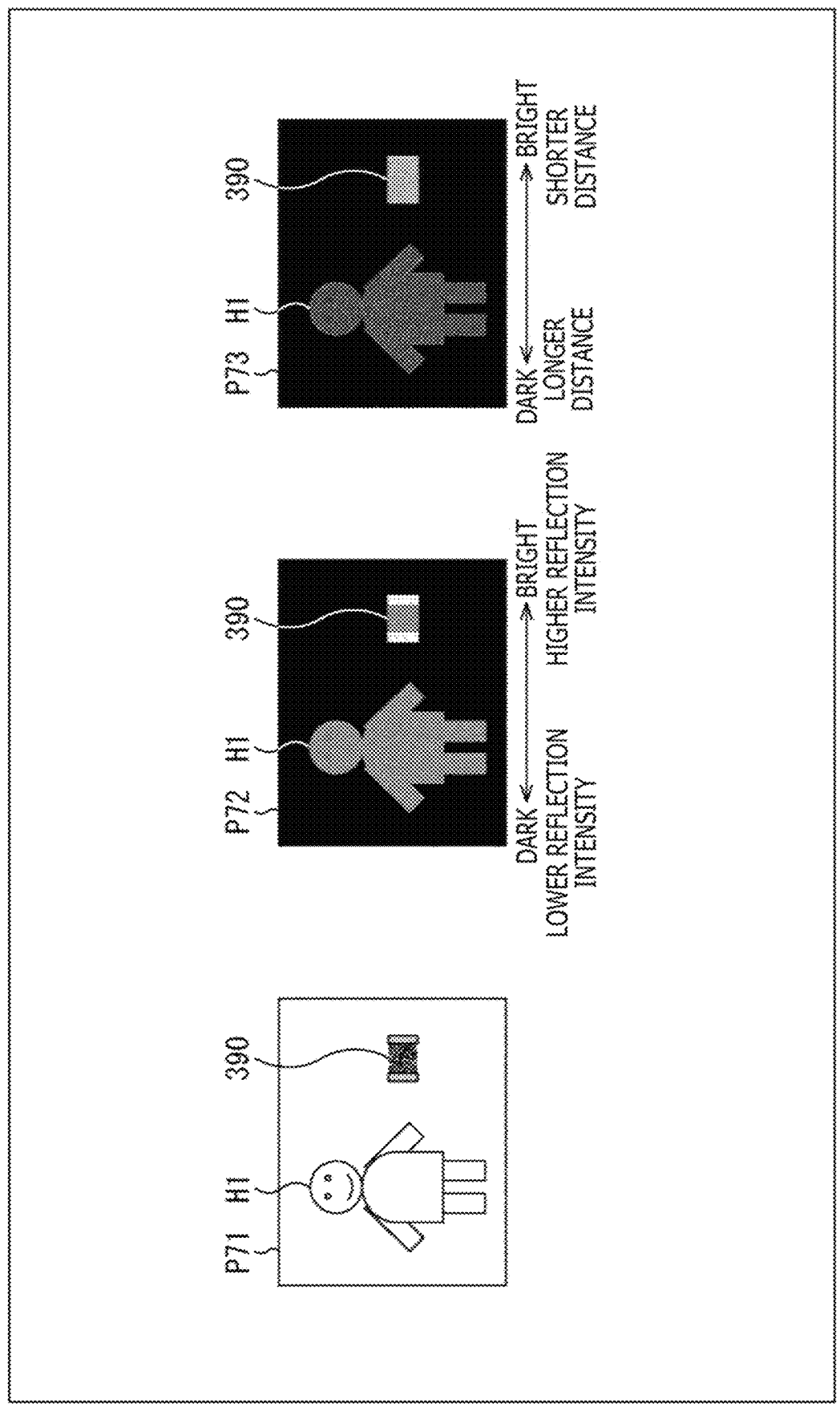
FIG. 21 is a diagram describing a LIDAR reflection intensity image and a LIDAR distance image.

As illustrated at the left in FIG. 21, it is assumed that, for example, a stereo camera image P71 is captured in which a person H1 is located at the left in the image and in which the target 390 is located on the right side.

In this case, a LIDAR reflection intensity image is captured as depicted by an image P72 at the center of FIG. 21. In FIG. 21, the higher the reflection intensity, the brighter the pixel of the LIDAR reflection intensity image, and the lower the reflection intensity, the darker the pixel. The laser reflectors 392-1 and 392-2 of the target 390 offer high reflection intensities because of their laser beam reflection ratios higher than those of other objects. The LIDAR image target detection section 401 identifies, on the basis of the LIDAR reflection intensity image P72, the region whose reflection intensity is higher than in other regions, as the region where the target 390 exists, and reads the corresponding coordinate position (x,y).

The LIDAR image target detection section 401 finds the distance corresponding to the coordinate position (x,y) of the target 390 found from the LIDAR reflection intensity image P72 in a LIDAR distance image P73 illustrated at the right in FIG. 21 as the distance to the target 390 based on the LIDAR image. It should be noted that, in the LIDAR distance image P73, the longer the distance, the darker the pixel, and the shorter the distance, the brighter the pixel.

Calibration Process Using the Object Detection Process Section Illustrated in FIG. 20

Figure 22:
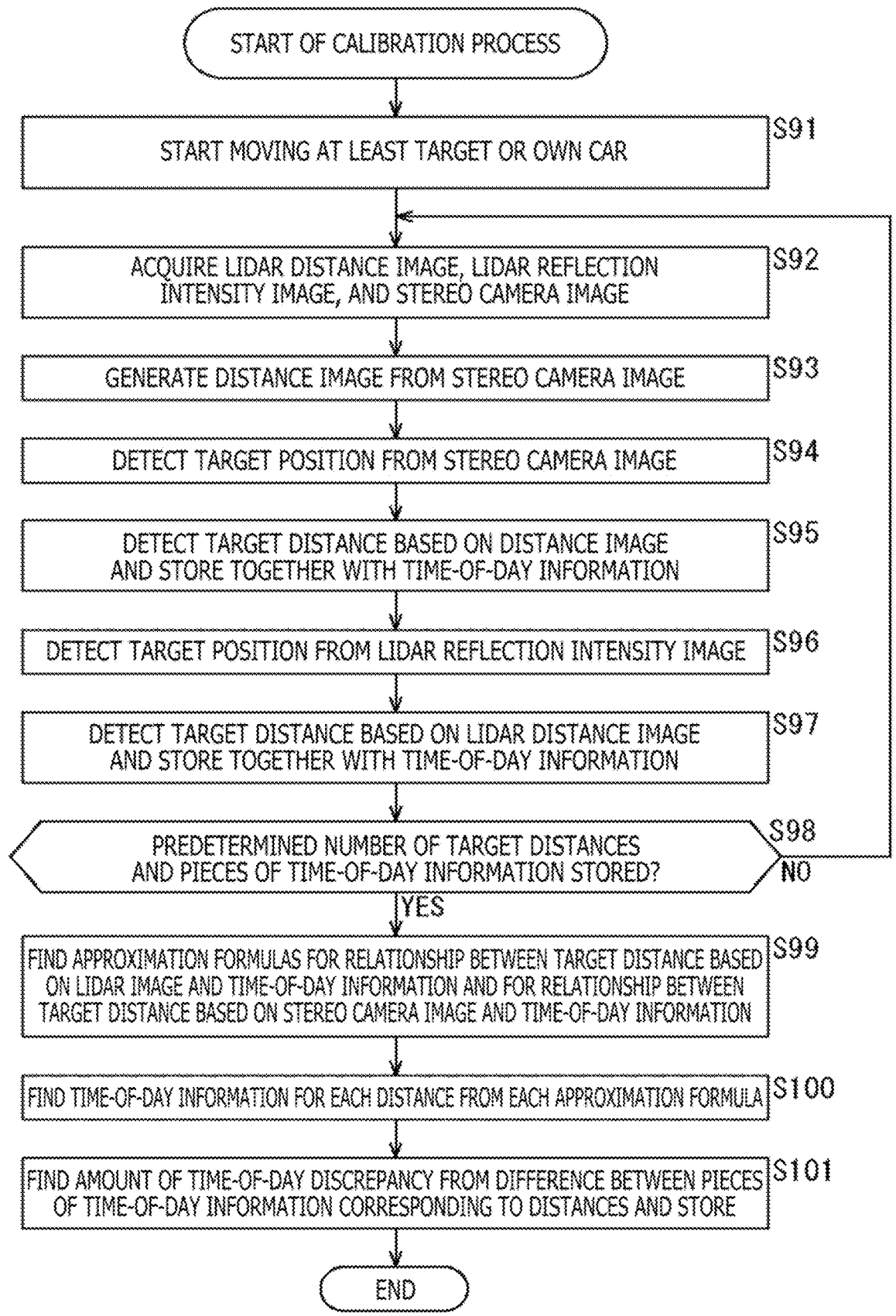
FIG. 22 is a flowchart describing the calibration process.

A description will be given next of the calibration process using the object detection process section illustrated in FIG. 20 with reference to the flowchart illustrated in FIG. 22. It should be noted that because the processes from step S91 to step S95 in the flowchart illustrated in FIG. 22 are similar to those from step S11 to step S15 described with reference to the flowchart illustrated in FIG. 12, the description thereof will be omitted.

In step S96, the LIDAR image target detection section 401 identifies the region whose reflection intensity is higher than in other regions as the region where the target 390 exists on the basis of the LIDAR reflection intensity image, detecting the corresponding coordinate position (x,y) as a target position.

In step S97, the LIDAR image target detection section 401 detects the distance corresponding to the coordinate position (x,y) of the target 390 found from the LIDAR reflection intensity image in the LIDAR distance image, the distance to the target 390 based on the LIDAR distance image, as the target distance zr based on the LIDAR image, outputting the target distance zr to the storage section 252 in association with time-of-day information for storage.

After as many target distances zr and pieces of time-of-day information as a predetermined number of times have been stored in the storage section 252 by repeating the processes from step S92 to step S98, the process proceeds to step S99.

In step S99, the time-of-day discrepancy detection section 253 reads the distance zs to the target 390 based on the stereo camera image and time-of-day information and the distance zr to the target based on the LIDAR image and time-of-day information stored in the storage section 252 and finds an approximation formula for the time of day of each of the distance zs and the distance zr.

In step S100, the time-of-day discrepancy detection section 253 finds the time of day of each of the distance zs and the distance zr for a predetermined distance on the basis of the found approximation formula.

In step S101, the time-of-day discrepancy detection section 253 finds an amount of time-of-day discrepancy from a difference between times of day for the distance zs and the distance zr, respectively, for a predetermined distance and stores the amount of time-of-day discrepancy in the time-of-day discrepancy storage section 254.

The above processes make it possible to find the amount of time-of-day discrepancy in the acquisition of the stereo camera image and the LIDAR image at the same distance between the stereo camera 51 and the LIDAR 371. By using the found amount of time-of-day discrepancy, it is possible to improve the accuracy of the detected object distance image obtained by combining the detection results of the stereo camera 51 and the LIDAR 371, thus ensuring improved accuracy of the detected object distance image. It should be noted that because the detected object distance image generation process is similar to the process described with reference to FIG. 13, the description thereof will be omitted.

5. Example of Performing Processes by Software

Incidentally, the above series of processes may be performed by hardware or software. In the case where the series of processes are performed by software, the program included in the software is installed from a recording medium to a computer incorporated in dedicated hardware, a general-purpose computer capable of executing various functions by installing various types of programs, or other computer.

Figure 23:
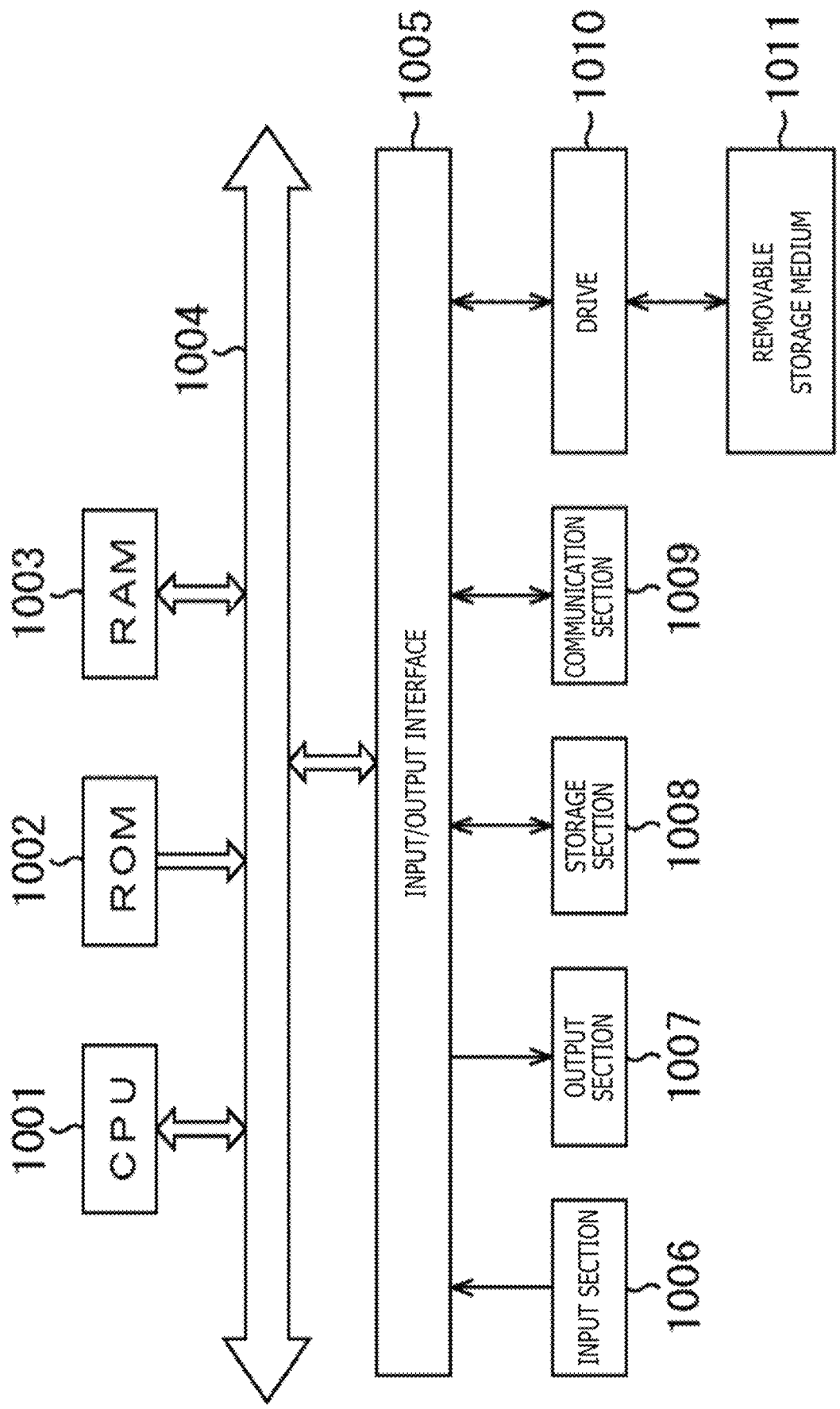
FIG. 23 is a diagram describing a configuration example of a general-purpose computer.

FIG. 23 illustrates a configuration example of a general-purpose computer. This computer incorporates a CPU (Central Processing Unit) 1001. An input/output interface 1005 is connected to the CPU 1001 via a bus 1004. A ROM (Read Only Memory) 1002 and a RAM (Random Access Memory) 1003 are connected to the bus 1004.

An input section 1006, an output section 1007, a storage section 1008, and a communication section 1009 are connected to the input/output interface 1005. The input section 1006 includes input devices such as a keyboard and a mouse with which a user inputs an operation command. The output section 1007 outputs a processing operation screen and a processing result image to a display device. The storage section 1008 includes a hard disk drive or other storage that stores programs and various pieces of data. The communication section 1009 includes a LAN (Local Area Network) adapter and other devices and performs a communication process via a network typified by the Internet. Also, a drive 1010 is connected that reads and writes data from and to a removable medium 1011 such as a magnetic disk (including a flexible disk), an optical disc (CD-ROM (Compact Disc-Read Only Memory), a DVD (Digital Versatile Disc), a magneto-optical disk (including an MD (Mini Disc)), or a semiconductor memory.

The CPU 1001 performs various processes in accordance with a program stored in the ROM 1002 or a program read from the removable medium 1011 such as a magnetic disk, an optical disc, a magneto-optical disk, or a semiconductor memory, installed to the storage section 1008, and loaded from the storage section 1008 into the RAM 1003. The RAM 1003 also stores, as appropriate, data required for the CPU 1001 to perform various processes.

In the computer configured as described above, the CPU 1001 performs the above series of processes, for example, by loading the program stored in the storage section 1008 into the RAM 1003 via the input/output interface 1005 and the bus 1004 for execution.

The program executed by the computer (CPU 1001) can be provided in a manner recorded in the removable medium 1011, for example, as a packaged medium. Also, the program can be provided via a wired or wireless transmission medium such as a local area network, the Internet, or digital satellite broadcasting.

In the computer, the program can be installed to the storage section 1008 via the input/output interface 1005 by inserting the removable medium 1011 into the drive 1010. Also, the program can be received by the communication section 1009 via a wired or wireless transmission medium and installed to the storage section 1008. In addition to the above, the program can be installed, in advance, to the ROM 1002 or the storage section 1008.

It should be noted that the program executed by the computer may perform the processes not only chronologically according to the sequence described in the present specification but also in parallel or at a necessary timing such as when the program is invoked.

Figure 6:
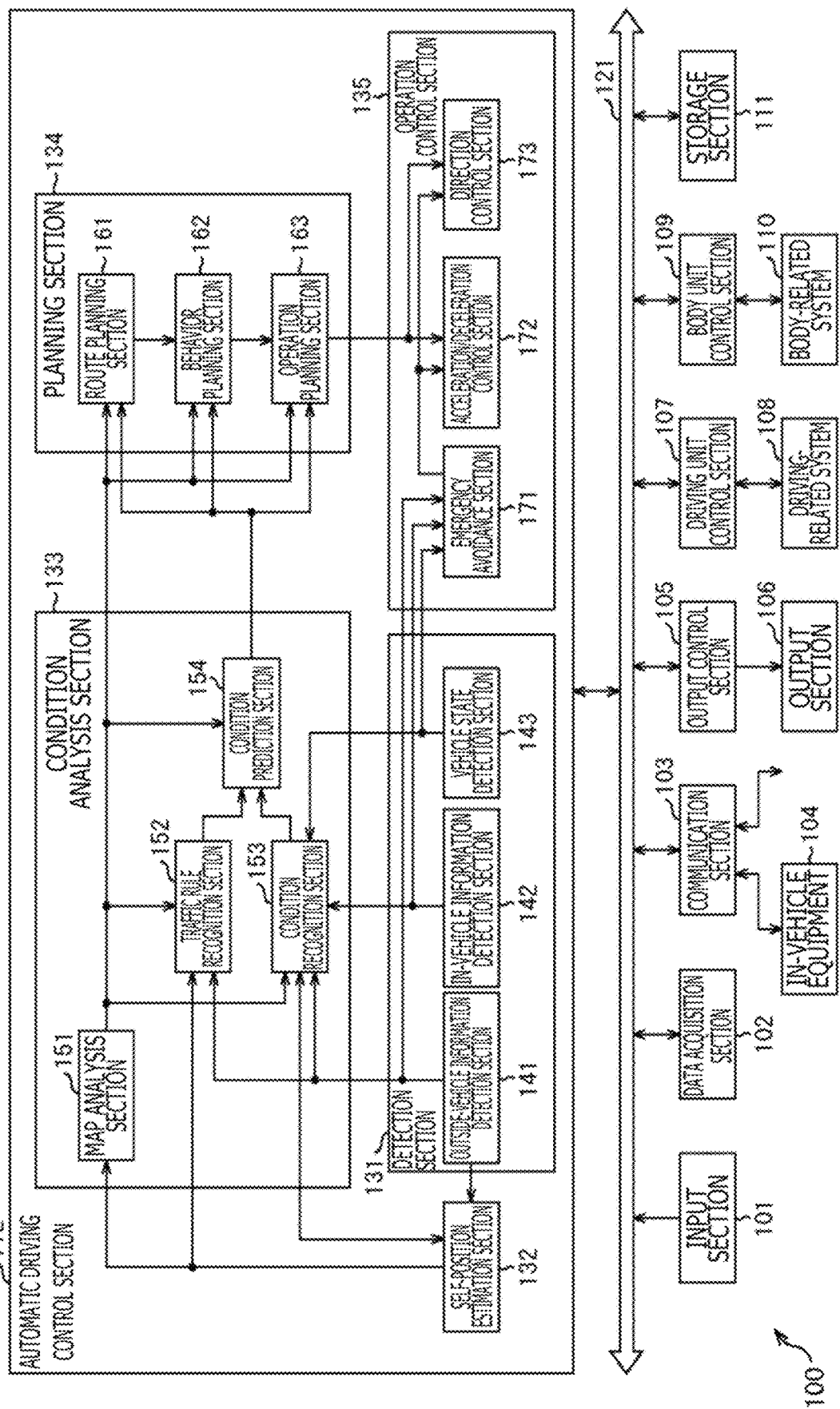
FIG. 6 is a block diagram describing a configuration example of a mobile object control system for controlling a mobile object of the present disclosure.

It should be noted that the CPU 1001 illustrated in FIG. 23 realizes the function of the automatic driving control section 112 illustrated in FIG. 6. Also, the storage section 1008 illustrated in FIG. 23 realizes the storage section 111 illustrated in FIG. 6.

Also, in the present specification, the term "system" refers to a set of a plurality of components (e.g., apparatuses, modules (parts)), and it does not matter whether or not all the components are provided in the same housing. Therefore, a plurality of apparatuses accommodated in separate housings and connected to each other via a network and a single apparatus having a plurality of modules accommodated in a single housing are both systems.

It should be noted that embodiments of the present disclosure are not limited to those described above and may be altered in various ways without departing from the gist of the present disclosure.

For example, the present disclosure can have a cloud computing configuration in which one function is processed by a plurality of apparatuses via a network in a shared and cooperative manner.

Also, each of the steps described in the above flowcharts can be performed not only by a single apparatus but also by a plurality of apparatuses in a shared manner.

Further, in the case where one step includes a plurality of processes, the plurality of processes included in the one step can be performed not only by a single apparatus but also by a plurality of apparatuses in a shared manner.

It should be noted that the present disclosure can also have the following configurations:

1

A signal processing apparatus including:
a first object detection section adapted to detect an object;
a second object detection section adapted to detect an object and different from the first object detection section; and
a time-of-day discrepancy detection section adapted to detect, as an amount of time-of-day discrepancy, a time-of-day discrepancy between a first time of day when a predetermined target is detected by the first object detection section and a second time of day when the predetermined target is detected by the second object detection section.

2

The signal processing apparatus of <1> further including:
a buffering section adapted to buffer detection results of the object of at least any one of the first object detection section or the second object detection section; and
a time-of-day discrepancy correction section adapted to set an amount of delay caused by the buffering section according to the amount of time-of-day discrepancy and correct the time-of-day discrepancy.

3

The signal processing apparatus of <1> or <2>, in which
the predetermined target is an object used to measure the amount of time-of-day discrepancy and includes
a first portion to be detected that can be detected by the first object detection section, and
a second portion to be detected that can be detected by the second object detection section.

4

The signal processing apparatus of <1>, in which
the first object detection section includes a stereo camera that captures the object as two stereo camera images having predetermined parallax,
the second detection section is a millimeter wave radar that detects the object with millimeter-wave radio waves and acquires a radar image,
the signal processing apparatus further includes a reference time-of-day generation section adapted to generate a reference time of day, and
each of the stereo camera image and the radar image includes time-of-day information that includes the reference time of day at a timing when the image is generated.

5

The signal processing apparatus of <4> including:
a distance image calculation section adapted to calculate, on a pixel-by-pixel basis, a distance to the predetermined target on the basis of the two images having the predetermined parallax included in the stereo camera image and generate a distance image having the distance as a pixel value;
a distance image target detection section adapted to detect, as a stereo camera image distance, a distance to the predetermined target in the distance image together with time-of-day information of the corresponding stereo camera image; and
a radar image target detection section adapted to detect a radar image distance, a distance to the predetermined target based on the radar image, together with time-of-day information of the corresponding radar image, in which
the time-of-day discrepancy detection section detects, as an amount of time-of-day discrepancy, a difference between the time-of-day information of the stereo camera image and the time-of-day information of the radar image whose stereo camera image distance and radar image distance match.

6

The signal processing apparatus of <5> further including:
a stereo camera image target position detection section adapted to detect a coordinate position of the predetermined target in the stereo camera image, in which
the distance image target detection section identifies, in the distance image, distance information of the coordinate position of the predetermined target detected by the stereo camera image target position detection section as a stereo camera image distance, a distance to the predetermined target, and detects the distance information together with time-of-day information of the corresponding stereo camera image, and
the radar image target detection section detects, as a radar image distance, a distance to the predetermined target, a distance with a high response intensity in the radar image within a close range of a position identified not only by the coordinate position of the predetermined target detected by the stereo camera image target position detection section but also by the stereo camera image distance, together with the time-of-day information of the corresponding radar image.

7

The signal processing apparatus of <5>, in which
the predetermined target includes
a radar reflector whose reflectance of radar waves of the millimeter wave radar is higher than a predetermined value, and
a marker recognizable with the stereo camera image.

8

The signal processing apparatus of <5> further including:
a stereo camera image target position detection section adapted to detect the coordinate position of the predetermined target in the stereo camera image; and
a reflecting cross-sectional area target position detection section adapted to detect a position of the predetermined target in the radar image on the basis of a reflecting cross-sectional area distribution in the radar image, in which
the distance image target detection section identifies, in the distance image, distance information of the coordinate position of the predetermined target as a stereo camera image distance, a distance to the predetermined target, and detects the distance information together with time-of-day information of the corresponding stereo camera image, and
the radar image target detection section detects, as a radar image distance, a distance corresponding to the position of the predetermined target in the radar image detected by the reflecting cross-sectional area target position detection section together with time-of-day information of the corresponding radar image.

9

The signal processing apparatus of <8>, in which
the distance image calculation section, the distance image target detection section, the radar image target detection section, and the time-of-day discrepancy detection section detect an amount of time-of-day discrepancy by repeatedly generating the distance image at predetermined time intervals, detecting the stereo camera image distance together with the time-of-day information of the corresponding stereo camera image, and detecting the radar image distance together with the time-of-day information of the corresponding radar image.

10

The signal processing apparatus of <8>, in which the predetermined target includes a preceding vehicle's license plate or a road sign.

11

The signal processing apparatus of <1>, in which
the first object detection section includes a stereo camera that captures the object as two stereo camera images having predetermined parallax,
the second object detection section includes LIDAR (Light Detection and Ranging, Laser Imaging Detection and Ranging) that detects the object with a laser beam and captures the object as an image responsive to a reflection intensity of the laser beam, the signal processing apparatus further includes a reference time-of-day generation section adapted to generate a reference time of day, and each of the stereo camera images and the LIDAR image captured by the LIDAR includes time-of-day information that includes the reference time of day at a timing when the image is generated.

12

The signal processing apparatus of <11> including:

a distance image calculation section adapted to calculate, on a pixel-by-pixel basis, a distance to a subject based on predetermined parallax from the stereo camera image and generate a distance image having the distance as a pixel value;

a distance image target detection section adapted to detect a stereo camera image distance based on the distance image, a distance to the predetermined target, together with time-of-day information of the corresponding stereo camera image; and a LIDAR image target detection section adapted to detect a LIDAR image distance based on the LIDAR image, a distance to the predetermined target, together with time-of-day information of the corresponding LIDAR image, in which the time-of-day discrepancy detection section detects, as an amount of time-of-day discrepancy, a difference between the time-of-day information of the stereo camera image and the time-of-day information of the LIDAR image whose stereo camera image distance and LIDAR image distance match.

13

The signal processing apparatus of <12> further including:

a stereo camera image target position detection section adapted to detect a coordinate position of the predetermined target in the stereo camera image, in which the distance image target detection section identifies, in the distance image, distance information of the coordinate position of the predetermined target detected by the stereo camera image target position detection section as a stereo camera image distance, a distance to the predetermined target, and detects the distance information together with the time-of-day information of the corresponding stereo camera image, the LIDAR image includes a LIDAR reflection intensity image having, as a pixel value of each pixel, a reflection intensity of the laser beam, and a LIDAR distance image that includes a distance image found by a ToF (Time of Flight) method on the basis of a round-trip time of the laser beam to a subject, and the LIDAR image target detection section considers, from the LIDAR reflection intensity image, a position with a particularly high reflection intensity as a position of the predetermined target and detects a distance of the position in the corresponding LIDAR distance image as a LIDAR image distance, a distance to the predetermined target, together with time-of-day information of the image responsive to the reflection intensity of the laser beam.

14

The signal processing apparatus of <11>, in which the predetermined target includes a laser reflector whose laser reflection ratio of the LIDAR is higher than a predetermined value, and a marker recognizable with the stereo camera image.

15

The signal processing apparatus of any one of <1> to <14>, in which the time-of-day discrepancy detection section finds a plurality of the time-of-day discrepancies and detects an amount of time-of-day discrepancy through a statistical process.

<16>

A signal processing method including:

a first object detection process adapted to detect an object;

a second object detection process adapted to detect an object in a manner different from the first object detection process; and a time-of-day discrepancy detection section adapted to detect, as an amount of time-of-day discrepancy, a time-of-day discrepancy between a first time of day when a predetermined target is detected by the first object detection process and a second time of day when the predetermined target is detected by the second object detection process.

17

A program causing a computer to perform processes including:

a first object detection section adapted to detect an object;

a second object detection section adapted to detect an object and different from the first object detection section; and a time-of-day discrepancy detection section adapted to detect, as an amount of time-of-day discrepancy, a time-of-day discrepancy between a first time of day when a predetermined target is detected by the first object detection section and a second time of day when the predetermined target is detected by the second object detection section.

18

A mobile object including:

a first object detection section adapted to detect an object;

a second object detection section adapted to detect an object and different from the first object detection section; and a time-of-day discrepancy detection section adapted to detect, as an amount of time-of-day discrepancy, a time-of-day discrepancy between a first time of day when a predetermined target is detected by the first object detection section and a second time of day when the predetermined target is detected by the second object detection section.

19

A signal processing system including:
a predetermined target; and
a signal processing apparatus, wherein
the signal processing apparatus includes
a first object detection section adapted to detect an object, a second object detection section adapted to detect an object and different from the first object detection section, and a time-of-day discrepancy detection section adapted to detect, as an amount of time-of-day discrepancy, a time-of-day discrepancy between a first time of day when the predetermined target is detected by the first object detection section and a second time of day when the predetermined target is detected by the second object detection section, and the predetermined target includes a first portion to be detected that can be detected by the first object detection section, and a second portion to be detected that can be detected by the second object detection section.

REFERENCE SIGNS LIST

11 Vehicle, 12 Target, 21 Polarization camera, 51 Stereo camera, 51L, 51R Cameras, 52 Millimeter wave radar, 53 Signal output section, 54 Reference time of day generation section, 71 Radar reflector, 72 Marker, 102 Data acquisition section, 112 Automatic driving control section, 141 Outside-vehicle information detection section, 152 Condition recognition section, 201L, 201R Imaging elements, 202L, 202R Image signal processing sections, 203L, 203R Time-of-day information addition sections, 211 Millimeter wave antenna, 212 Radar reception signal processing section, 213 Time-of-day information addition section, 231 Calibration process section, 232 Detected object distance image generation section, 251 Object detection process section, 252 Storage section, 253 Time-of-day discrepancy detection section, 254 Time-of-day discrepancy storage section, 271 Delay buffer, 272 Time-of-day discrepancy correction process section, 273 Image processing section, 291 Distance image calculation section, 292 Distance image target detection section, 293 Stereo camera image target detection section, 294 Radar image target detection section, 301 License plate, 302 Road sign, 311 Distance image calculation section, 312 Stereo camera image license plate detection section, 321 Reflecting cross-sectional area distribution estimation section, 322 Vehicle position estimation section, 323 Reflecting cross-sectional area distribution database, 324 Radar image license plate detection section, 371 LIDAR, 381 . . . Laser projection/reception section, 382 Signal processing section, 383 Time-of-day information addition section, 390 Target, 391 Marker, 392-1, 392-2 Laser reflectors, 401 LIDAR image target detection section

The invention claimed is:

1. A signal processing apparatus comprising:
a first detector to detect an object, the first detector including a stereo camera that captures the object as two stereo camera images having predetermined parallax;
a second detector to detect an object, which is different from the first detector, the second detector being a millimeter wave radar that detects the object with millimeter-wave radio waves and acquires a radar image; and
circuitry configured to
detect, as an amount of time-of-day discrepancy, a time-of-day discrepancy between a first time of day when a predetermined target is detected by the first detector and a second time of day when the predetermined target is detected by the second detector, wherein the circuitry is further configured to
generate a reference time of day, wherein each of the stereo camera image and the radar image includes time-of-day information that includes the reference time of day at a timing when the image is generated,
calculate, on a pixel-by-pixel basis, a distance to the predetermined target on a basis of the two images having the predetermined parallax included in the stereo camera image, and generate a distance image having the distance as a pixel value,
detect, as a stereo camera image distance, a distance to the predetermined target in the distance image together with time-of-day information of the corresponding stereo camera image, and
detect a radar image distance, a distance to the predetermined target based on the radar image, together with time-of-day information of the corresponding radar image,
wherein the amount of time-of-day discrepancy is detected by a difference between the time-of-day information of the stereo camera image and the time-of-day information of the radar image whose stereo camera image distance and radar image distance match.

2. The signal processing apparatus of claim 1, further comprising:
a buffering memory to buffer detection results of the object of at least any one of the first detector or the second detector; and
wherein the circuitry is further configured to set an amount of delay caused by the buffering memory according to the amount of time-of-day discrepancy and correct the time-of-day discrepancy.

3. The signal processing apparatus of claim 1, wherein the predetermined target is an object used to measure the amount of time-of-day discrepancy and includes
a first portion to be detected that is detected by the first detector, and
a second portion to be detected that can be detected by the second detector.

4. The signal processing apparatus of claim 1, wherein the circuitry is further configured to
detect a coordinate position of the predetermined target in the stereo camera image, wherein
the circuitry identifies, in the distance image, distance information of the coordinate position of the predetermined target detected by the stereo camera image target position detection section as a stereo camera image distance, a distance to the predetermined target, and detects the distance information together with time-of-day information of the corresponding stereo camera image, and
the circuitry detects, as a radar image distance, a distance to the predetermined target, a distance with a high response intensity in the radar image within a close range of a position identified not only by the coordinate position of the predetermined target but also by the stereo camera image distance, together with the time-of-day information of the corresponding radar image.

5. The signal processing apparatus of claim 1, wherein the predetermined target includes
a radar reflector whose reflectance of radar waves of the millimeter wave radar is higher than a predetermined value, and
a marker recognizable with the stereo camera image.

6. The signal processing apparatus of claim 1, wherein the circuitry is further configured to
  detect the coordinate position of the predetermined target in the stereo camera image; and
  detect a position of the predetermined target in the radar image on a basis of a reflecting cross-sectional area distribution in the radar image, wherein
  the circuitry identifies, in the distance image, distance information of the coordinate position of the predetermined target as a stereo camera image distance, a distance to the predetermined target, and detects the distance information together with time-of-day information of the corresponding stereo camera image, and
  the circuitry detects, as a radar image distance, a distance corresponding to the position of the predetermined target in the radar image together with time-of-day information of the corresponding radar image.

7. The signal processing apparatus of claim 6, wherein the circuitry is configured to detect an amount of time-of-day discrepancy by repeatedly generating the distance image at predetermined time intervals, detecting the stereo camera image distance together with the time-of-day information of the corresponding stereo camera image, and detecting the radar image distance together with the time-of-day information of the corresponding radar image.

8. The signal processing apparatus of claim 6, wherein the predetermined target includes a preceding vehicle's license plate or a road sign.

9. The signal processing apparatus of claim 1, wherein the second detector includes LIDAR (Light Detection and Ranging, Laser Imaging Detection and Ranging) that detects the object with a laser beam and captures the object as an image responsive to a reflection intensity of the laser beam,
  each of the stereo camera images and a LIDAR image captured by the LIDAR includes time-of-day information that includes the reference time of day at a timing when the image is generated.

10. The signal processing apparatus of claim 9, wherein the circuitry is further configured to
  calculate, on a pixel-by-pixel basis, a distance to a subject based on predetermined parallax from the stereo camera image and generate a distance image having the distance as a pixel value;
  detect a stereo camera image distance based on the distance image, a distance to the predetermined target, together with time-of-day information of the corresponding stereo camera image; and
  detect a LIDAR image distance based on the LIDAR image, a distance to the predetermined target, together with time-of-day information of the corresponding LIDAR image, wherein
  the circuitry detects, as the amount of time-of-day discrepancy, a difference between the time-of-day information of the stereo camera image and the time-of-day information of the LIDAR image whose stereo camera image distance and LIDAR image distance match.

11. The signal processing apparatus of claim 10, wherein the circuitry is further configured to
  detect a coordinate position of the predetermined target in the stereo camera image, wherein
  the circuitry identifies, in the distance image, distance information of the coordinate position of the predetermined target detected by the stereo camera image target position detection section as a stereo camera image distance, a distance to the predetermined target, and detects the distance information together with the time-of-day information of the corresponding stereo camera image,
  the LIDAR image includes a LIDAR reflection intensity image having, as a pixel value of each pixel, a reflection intensity of the laser beam, and a LIDAR distance image that includes a distance image found by a ToF (Time of Flight) method on a basis of a round-trip time of the laser beam to a subject, and
  the circuitry considers, from the LIDAR reflection intensity image, a position with a particularly high reflection intensity as a position of the predetermined target and detects a distance of the position in the corresponding LIDAR distance image as a LIDAR image distance, a distance to the predetermined target, together with time-of-day information of the image responsive to the reflection intensity of the laser beam.

12. The signal processing apparatus of claim 9, wherein the predetermined target includes
  a laser reflector whose laser reflection ratio of the LIDAR is higher than a predetermined value, and
  a marker recognizable with the stereo camera image.

13. The signal processing apparatus of claim 1, wherein the circuitry finds a plurality of the time-of-day discrepancies and detects an amount of time-of-day discrepancy through a statistical process.

14. A signal processing method comprising:
  detecting an object by a first detector including a stereo camera that captures the object as two stereo camera images having predetermined parallax;
  detecting an object by a second detector being a millimeter wave radar that detects the object with millimeter-wave radio waves and acquires a radar image;
  detecting, as an amount of time-of-day discrepancy, a time-of-day discrepancy between a first time of day when a predetermined target is detected by the first detector and a second time of day when the predetermined target is detected by the second detector;
  generating a reference time of day, wherein each of the stereo camera image and the radar image includes time-of-day information that includes the reference time of day at a timing when the image is generated;
  calculating, on a pixel-by-pixel basis, a distance to the predetermined target on a basis of the two images having the predetermined parallax included in the stereo camera image, and generating a distance image having the distance as a pixel value;
  detecting, as a stereo camera image distance, a distance to the predetermined target in the distance image together with time-of-day information of the corresponding stereo camera image; and
  detecting a radar image distance, a distance to the predetermined target based on the radar image, together with time-of-day information of the corresponding radar image,
  wherein the amount of time-of-day discrepancy is detected by a difference between the time-of-day information of the stereo camera image and the time-of-day information of the radar image whose stereo camera image distance and radar image distance match.

15. A non-transitory computer-readable recording medium storing a computer executable program causing a computer to perform processes comprising:
  detecting an object by a first detector including a stereo camera that captures the object as two stereo camera images having predetermined parallax;

detecting an object by a second detector being a millimeter wave radar that detects the object with millimeter-wave radio waves and acquires a radar image;
detecting, as an amount of time-of-day discrepancy, a time-of-day discrepancy between a first time of day when a predetermined target is detected by the first detector and a second time of day when the predetermined target is detected by the second detector;
generating a reference time of day, wherein each of the stereo camera image and the radar image includes time-of-day information that includes the reference time of day at a timing when the image is generated;
calculating, on a pixel-by-pixel basis, a distance to the predetermined target on a basis of the two images having the predetermined parallax included in the stereo camera image, and generating a distance image having the distance as a pixel value;
detecting, as a stereo camera image distance, a distance to the predetermined target in the distance image together with time-of-day information of the corresponding stereo camera image; and
detecting a radar image distance, a distance to the predetermined target based on the radar image, together with time-of-day information of the corresponding radar image,
wherein the amount of time-of-day discrepancy is detected by a difference between the time-of-day information of the stereo camera image and the time-of-day information of the radar image whose stereo camera image distance and radar image distance match.

16. A mobile object comprising:
a first detector to detect an object, the first detector including a stereo camera that captures the object as two stereo camera images having predetermined parallax;
a second detector to detect an object, which is different from the first detector, the second detector being a millimeter wave radar that detects the object with millimeter-wave radio waves and acquires a radar image; and
circuitry configured to
detect, as an amount of time-of-day discrepancy, a time-of-day discrepancy between a first time of day when a predetermined target is detected by the first detector and a second time of day when the predetermined target is detected by the second detector,
wherein the circuitry is further configured to
generate a reference time of day, wherein each of the stereo camera image and the radar image includes time-of-day information that includes the reference time of day at a timing when the image is generated,
calculate, on a pixel-by-pixel basis, a distance to the predetermined target on a basis of the two images having the predetermined parallax included in the stereo camera image, and generate a distance image having the distance as a pixel value,
detect, as a stereo camera image distance, a distance to the predetermined target in the distance image together with time-of-day information of the corresponding stereo camera image, and
detect a radar image distance, a distance to the predetermined target based on the radar image, together with time-of-day information of the corresponding radar image,
wherein the amount of time-of-day discrepancy is detected by a difference between the time-of-day information of the stereo camera image and the time-of-day information of the radar image whose stereo camera image distance and radar image distance match.

17. A signal processing system comprising:
a predetermined target; and
a signal processing apparatus, wherein
the signal processing apparatus includes
a first detector to detect an object, the first detector including a stereo camera that captures the object as two stereo camera images having predetermined parallax;
a second detector to detect an object, which is different from the first detector, the second detector being a millimeter wave radar that detects the object with millimeter-wave radio waves and acquires a radar image; and
circuitry configured to
detect, as an amount of time-of-day discrepancy, a time-of-day discrepancy between a first time of day when a predetermined target is detected by the first detector and a second time of day when the predetermined target is detected by the second detector,
wherein the circuitry is further configured to
generate a reference time of day, wherein each of the stereo camera image and the radar image includes time-of-day information that includes the reference time of day at a timing when the image is generated,
calculate, on a pixel-by-pixel basis, a distance to the predetermined target on a basis of the two images having the predetermined parallax included in the stereo camera image, and generate a distance image having the distance as a pixel value,
detect, as a stereo camera image distance, a distance to the predetermined target in the distance image together with time-of-day information of the corresponding stereo camera image, and
detect a radar image distance, a distance to the predetermined target based on the radar image, together with time-of-day information of the corresponding radar image,
wherein the amount of time-of-day discrepancy is detected by a difference between the time-of-day information of the stereo camera image and the time-of-day information of the radar image whose stereo camera image distance and radar image distance match, and
wherein the predetermined target includes
a first portion to be detected that is detected by the first detector, and
a second portion to be detected that is detected by the second detector.

* * * * *